United States Patent [19]

Simroth et al.

[11] Patent Number: 4,652,589

[45] Date of Patent: Mar. 24, 1987

[54] POLYMER/POLYOLS HAVING IMPROVED COMBUSTION RESISTANCE AND INTRINSIC VISCOSITY, METHODS OF MAKING SAME AND POLYURETHANES PREPARED THEREFROM

[75] Inventors: Donald W. Simroth, Charleston; Frank E. Critchfield, South Charleston; Richard C. Myerly, Charleston, all of W. Va.

[73] Assignee: Union Carbide Corporation, Danbury, Conn.

[21] Appl. No.: 699,970

[22] Filed: Feb. 8, 1985

[51] Int. Cl.$^4$ .................. C08G 18/14; C08G 18/63; C09K 3/00

[52] U.S. Cl. .................. 521/137; 252/182; 524/762; 524/923; 528/75

[58] Field of Search .................. 521/137; 252/182; 528/75; 524/762, 923

[56] References Cited

U.S. PATENT DOCUMENTS

| | | | |
|---|---|---|---|
| Re. 28,715 | 2/1976 | Stamberger | 260/33.2 R |
| Re. 29,014 | 10/1976 | Pizzini et al. | 260/33.2 R |
| 3,304,273 | 2/1967 | Stamberger | 260/2.5 |
| 3,652,639 | 3/1972 | Pizzini et al. | 260/465.4 |
| 3,655,553 | 4/1972 | DeWald | 252/1 |
| 3,823,201 | 7/1974 | Pizzini et al. | 260/861 |
| 3,850,861 | 11/1974 | Fabris et al. | 521/170 |
| 3,875,258 | 4/1975 | Patton, Jr. et al. | 260/869 |
| 3,931,092 | 1/1976 | Ramlow et al. | 260/33.4 R |
| 3,953,393 | 4/1976 | Ramlow et al. | 260/368 R |
| 4,014,846 | 3/1977 | Ramlow et al. | 260/33.2 R |
| 4,119,586 | 10/1978 | Shah | 521/137 |
| 4,144,840 | 3/1979 | Bubien | 119/3 |
| 4,148,840 | 4/1979 | Shah | 521/137 |
| 4,172,825 | 10/1979 | Shook et al. | 260/33.2 R |
| 4,208,314 | 6/1980 | Priest et al. | 260/33.2 R |
| 4,230,823 | 10/1980 | Alberts et al. | 521/137 |
| 4,242,249 | 12/1980 | VanCleve et al. | 260/33.2 R |
| 4,272,619 | 6/1981 | Balle et al. | 521/169 |
| 4,357,430 | 11/1982 | VanCleve | 521/128 |
| 4,454,255 | 6/1984 | Ramlow et al. | 521/137 |
| 4,458,038 | 7/1984 | Ramlow et al. | 521/137 |
| 4,460,715 | 7/1984 | Hoffman et al. | 521/137 |
| 4,463,107 | 7/1984 | Simroth et al. | 521/137 |

FOREIGN PATENT DOCUMENTS

| | | |
|---|---|---|
| 735010 | 5/1966 | Canada . |
| 48-101494 | 12/1973 | Japan . |
| 80919 | 7/1975 | Japan . |
| 52-005887 | 11/1977 | Japan . |
| 1126025 | 9/1968 | United Kingdom . |

*Primary Examiner*—Herbert S. Cockeram
*Attorney, Agent, or Firm*—Paul W. Leuzzi, II

[57] ABSTRACT

A normally liquid, stable polymer/polyol composition which imparts improved combustion resistance to polyurethane foams prepared therefrom while retaining satisfactory foam tensile properties are formed by polymerizing in the presence of a free radical catalyst and in the essential absence of an alkyl mercaptan, (1) from about 25 to about 60 weight percent of an ethylenically unsaturated monomer or monomers, for example, a mixture of acrylonitrile and styrene in a weight ratio respectively of 25:75 to 0:100, dissolved or dispersed in (2) from about 40 to about 75 weight percent of a polyol comprising a base polyol having a hydroxyl number of less than about 150, wherein the polymer is characterized by a crosslinking coefficient of less than 55 and an intrinsic viscosity of at least 0.30.

A process for treating the resulting polymer/polyol composition to reduce the product viscosity to essentially the indigenous system viscosity in polymer/polyol compositions of this type is disclosed, as is a stabilizer precursor which assists in stabilizing the resulting polymer/polyol compositions.

88 Claims, No Drawings

POLYMER/POLYOLS HAVING IMPROVED COMBUSTION RESISTANCE AND INTRINSIC VISCOSITY, METHODS OF MAKING SAME AND POLYURETHANES PREPARED THEREFROM

BACKGROUND OF THE INVENTION

1. Field of the Invention

This invention relates to polymer/polyol compositions and to polyurethanes utilizing such polymer/polyol compositions.

2. Description of the Prior Art

Polymer/polyol compositions suitable for use in producing polyurethane foams, elastomers and the like are known materials. The basic patents in the field are Stamberger Re. 28,715 (reissue of U.S. Pat. No. 3,383,351) and Re. 29,118 (reissue of U.S. Pat. No. 3,304,273). Such compositions can be produced by polymerizing one or more ethylenically unsaturated monomers dissolved or dispersed in a polyol in the presence of a free radical catalyst to form a stable dispersion of polymer particles in the polyol. These polymer/polyol compositions have the valuable property of imparting to, for example, polyurethane foams and elastomers produced therefrom, higher load-bearing properties than are provided by the corresponding unmodified polyols.

The polymer/polyol compositions that found initial commercial acceptance were primarily compositions produced using acrylonitrile. Many of these compositions were somewhat higher in viscosity than desired in some applications. More recently, polymer/polyol compositions produced from acrylonitrile-styrene monomer mixtures have been used commercially.

Polyurethane foams made with polymer/polyols are widely utilized. The two major types of foam are generally termed slabstock and molded. More particularly, slabstock foams employing polymer/polyol compositions are used in the carpet, furniture and bedding industries. One primary use of slabstock foam is as carpet underlay.

In the molded foam area, the primary type of foam employed is generally termed high resiliency (HR) molded foam. HR molded foams have been widely used in the automotive industry for applications ranging from molded seats to energy-absorbing padding and the like.

The wide demand for polymer/polyols has spawned a number of trends that have created the need for additional technology. For example, the general trend is to provide slabstock foams that are virtually scorch-free, i.e.—white foam products. Indeed, the desire is to provide techniques capable of producing, without substantial economic penalty, virtually scorch-free foams at ever-decreasing densities (viz.—1.5 pounds per cubic foot or less) while maintaining satisfactory load-bearing and other foam properties.

Such scorch-free foams have been obtained by utilizing relatively high styrene contents (e.g.— about 65 to 70 percent styrene) in the acrylonitrile-styrene monomer mixture. The utilization of such high styrene monomer mixtures in the molded foam area is also widespread.

The preparation of polymer/polyols from such high styrene monomer mixtures creates difficulties. More particularly, such difficulties arise due to the state of the art to which polyurethane production has now advanced. There is now concern over the degree of the stability of polymer/polyol compositions. Many applications require somewhat rigorous stability characteristics, and such characteristics become more difficult to achieve when high styrene monomer mixtures are employed.

A further trend is the desire to provide foams with ever-increasing load-bearing characteristics for many applications. This is particularly prevalent in the slabstock area where many formulations require the use of "neat" polymer/polyols, i.e.—the polymer/polyol is employed without dilution with conventional polyols. While typically not used neat in the molded foam area, polymer/polyols capable of imparting higher and higher load-bearing characteristics to such foams are likewise desired.

Such increased load-bearing characteristics are being obtained by increasing the polymer or solids content of the polymer/polyol. Solids contents of 35 to 40 weight percent or even more are accordingly desired. Preparing such high solids content polymer/polyols with the degree of stability often desired becomes substantially more difficult as the solids content is increased.

The trend toward the use of high styrene monomer mixtures and high solids content polymer/polyols has likewise resulted in polymer/polyols sometimes having higher than desired viscosities. The viscosity of a polymer/polyol must, of course, be sufficiently low to allow ease in handling during manufacture. Moreover, the viscosity must allow ready transport, handling and, ultimately, adequate processability in the foam processing equipment being utilized. The viscosity level is becoming of acute concern in the molded area due to the sophisticated mixing systems, such as impingement systems, that are increasingly being utilized. There is a clear need to provide the desired polymer/polyols with as low a viscosity as possible.

Also, the degree of stability of the polymer/polyol, as alluded to previously, is of concern. At one time, there was not much concern for the seediness or filterability of polymer/polyols in actual commercial practice. However, the state of the art of polyurethane production has now advanced to the point where these considerations are very important in many applications. This is particularly important in the molded foam area.

Thus, the development of sophisticated, high-speed and large-volume equipment, machines and systems for handling, mixing and reacting polyurethane-forming ingredients has created the need for highly stable and low viscosity polymer/polyols. Polymer/polyols must accordingly meet certain minimum requirements in order to be capable of being satisfactorily processed in the sophisticated foam equipment now used. Typically, the prime requirement is that the polymer/polyols possess sufficiently small particles so that filters, pumps and the like do not become plugged or fouled in relatively short periods of time.

While somewhat simplified, the commercial processability of a particular polymer/polyol comes down to its stability against phase separation, i.e., the polymer particles settling out of the polyol medium. Stability of the dispersion is thus a prime consideration in insuring that the polymer/polyols can be processed in commercial production equipment without the necessity of additional mixing to insure uniformity.

Since the basic development by Stamberger, a substantial amount of effort has been devoted to providing improved polymer/polyols and to improved preparation techniques. For example, U.S. Pat. No. 4,208,314 to Priest et al. discloses low viscosity polymer/polyols made from acrylonitrile-styrene monomer mixtures. These polymer/polyols can be converted to low-density, water-blown polyurethane foams having reduced scorch, especially when the acrylonitrile-to-styrene ratio is relatively low. The Priest et al. patent also provides a process for making polymer/polyols whereby the particulate nature of the polymer portion of the product is considerably improved, compared to polymer/polyols prepared by prior processes. The improved process provided by Priest et al. includes, in general, maintaining a low monomer to polyol concentration throughout the reaction mixture during the polymerization.

A further improvement in the formation of polymer/polyols is provided by U.S. Pat. No. 4,148,840 to Shah. This discloses a process for producing highly stable and filterable polymer/polyol compositions by polymerizing the monomer or monomers in situ in a polyol mixture that includes a minor amount of preformed polymer/polyol.

It has been recognized that the stability of polymer/polyols requires the presence of a minor amount of a graft or addition copolymer which is formed in situ from growing polymer chains and polyol molecules. Some prior approaches have thus been directed to incorporation of unsaturation into the polyol in addition to that inherently present in the polyoxyalkylene polyols typically used in forming polymer/polyols in the belief that improved stability will result due to an increased amount of an addition copolymer stabilizer expected to be formed. U.S. Pat. Nos. 3,652,639, 3,823,201, and 3,850,861, British Pat. No. 1,126,025 and Japanese Pat. Nos. 52-80919 and 48-101494 all utilize this approach.

In a similar vein, the use of what may be termed "stabilizer precursors" has been proposed. More specifically, the concept is to carry out the preparation of the polymer/polyol in the presence of a suitable amount of the stabilizer precursor, which precursor comprises what has been termed a "macromer" that contains a particular level of reactive unsaturation. The belief is that, during polymerization in the preparation of the polymer/polyol, adequate amounts of stabilizer will be formed by the addition polymerization of the precursor stabilizer with a growing polymer chain. The concept of using stabilizer precursors in polymerization is a well-recognized and old technique as discussed in "Dispersion Polymerization in Organic Media", edited by K. E. J. Barrett, John Wiley & Sons, copyright 1975. U.S. Pat. Nos. 4,454,255 and 4,458,038 are recent examples utilizing this technique. The macromer in the '255 and '038 patents may be obtained by reacting a polyol with a compound having reactive ethylenic unsaturation such as, for example, maleic anhydride or fumaric acid. A further example of the use of this technique is U.S. Pat. No. 4,460,715. The reactive unsaturation in the '715 stabilizers is provided by an acrylate or methacrylate moiety.

The use of chain transfer agents in the preparation of polymer/polyol compositions has been proposed for a variety of purposes, including reaction moderation and lowering the viscosity of such compositions. Various chain transfer agents, including mercaptans, alcohols, and the like have been suggested.

For example, U.S. Pat. No. 3,655,553 discloses a polymer/polyol prepared by the grafting of a mixture of vinyl chloride and vinylidene chloride onto a polyol such that the resulting polymer/polyol dispersion has a chloride content of at least 15% by weight. From 0 to 5 weight percent of a chain transfer agent may be used. It is stated that the viscosity of the grafted product can be reduced by the presence of a chain transfer agent during the polymerization. A number of chain transfer agents are described as being suitable, including halogenated hydrocarbons, mercaptans, aldehydes, and the like.

U.S. Pat. No. 3,850,861 discloses a polymer/polyol prepared from an unsaturated polyether polyol in which the polymerization can be carried out in the presence of a chain transfer agent in an amount sufficient to prevent the formation of higher-than-desired molecular weights.

U.S. Pat. No. 3,953,393 discloses a polymer/polyol prepared by the in situ polymerization of a vinyl monomer in an unsaturation-containing polyol in the presence of an alkyl mercaptan chain transferring agent. The dispersions are stated to have lower viscosity than those of the prior art.

In U.S. Pat. No. 4,144,840, it is stated that the polymer/polyols disclosed therein can be prepared in the presence of any known chain transfer agent, if desired. The polymer/polyol compositions have low viscosities with relatively high polymer contents.

U.S. Pat. No. 4,230,823 discloses the use of certain enol ethers as chain transferring agents in the preparation of polymer/polyols to provide a relatively low viscosity polymer/polyol even at a relatively high solids content. It is noted that the alkyl mercaptans commonly suggested for use in preparing polymer/polyol compositions do not provide the desired lower viscosity of the polymer/polyol because the mercaptans compete with the polyether polyol as transferrers with a high transfer content.

Further, U.S. Pat. Nos. 4,454,255 and 4,458,038 are directed to low viscosity, white graft polymer dispersions having a high polymer content made by polymerizing an ethylenically unsaturated monomer or mixture of monomers in a polyol mixture which includes a polyoxyalkylene polyether polyol and a macromer containing induced unsaturation. It is stated that chain transfer agents may be employed as "reaction moderators," suitable chain transfer agents including, among others, isopropanol, ethanol, 1-butanol, carbon tetrachloride, and the like.

Still further, U.S. Pat. No. 4,014,846 describes the synthesis of finely divided polymeric solids in various solvents, including isopropanol and methanol. The solids are then dispersed in polyol to form the dispersion.

A further concern that polyurethane producers must address is the combustibility resistance standards that must be satisfied for many applications. In the slabstock foam area, perhaps the most commonly employed standard is the well known California Vertical Burn test. To attempt to satisfy this rigorous standard, polyurethanes prepared using polymer/polyols have historically required relatively high levels of flame retardants. Such flame retardant levels represent an obvious economic penalty, and such levels can be so excessive as to adversely affect other desired foam properties. Moreover, even with the use of relatively high flame retardant levels, satisfying the California test criteria can be problemmatical.

In the molded foam area, the typical standard utilized is the Federal Motor Vehicle Safety Standard (FMVSS) No. 302. Attempts to satisfy this standard have, in the past, utilized relatively moderate levels of flame retardants. However, more recently, due to instability of suitable flame retardants in polyurethane premixes resulting in the requirement for separate metering, the need was created to provide polymer/polyols capable of satisfying this test without using any flame retardant additive.

Simroth et al., U.S. Pat. No. 4,463,107, discovered that improved combustion resistance of polyurethane foams could be obtained if the structural properties of the polymer portion of the polymer/polyol is adjusted to provide a crosslinking coefficient below about 55. The reduction of the crosslinking coefficient to the desired level may be accomplished by controlling a variety of process parameters, including the free radical polymerization catalyst concentration, the residence time, the ratio of acrylonitrile-to-styrene, and/or by the utilization of a variety of chain transfer agents. Utilizing the '107 invention provides polymer/polyols which, upon conversion to polyurethanes, can readily satisfy the FMVSS-302 standard without using flame retardant additives. Moreover, polyurethanes made from polymer/polyols using the '107 invention can readily pass the California test with moderate and acceptable flame retardant levels. Indeed, utilizing this invention may even allow the California test to be satisfied without the addition of flame retardants.

Unfortunately, it has been found that use of these techniques can impact upon the tensile properties of the foam, i.e.—the tensile and tear strengths and elongation. Indeed, this impact can be enough to reduce the tensile properties to levels below those considered desirable for certain applications.

Moreover, in addition to the combustibility resistance concern, the trends discussed herein have created the need for additional technology to allow preparation of the desired polymer/polyols in a commercially attractive fashion.

OBJECTS OF THE INVENTION

Accordingly, it is a primary object of the present invention to provide a polymer/polyol composition capable of being converted to a polyurethane foam having the desired combustion resistance while retaining suitable tensile properties.

A further object of this invention provides relatively high solids polymer/polyols capable of being converted to polyurethane products characterized by superior load-bearing characteristics.

Yet another object lies in the provision of white polymer/polyols capable of conversion to scorch-free polyurethanes.

A still further object of the present invention is to provide polymer/polyols characterized by essentially the minimum product viscosities for the particular stable dispersion involved.

Another object provides a process for making such polymer/polyols that is relatively straightforward and does not require significant economic penalties as compared with currently known techniques.

Yet another object of this invention is to provide scorch-free polyurethane products characterized by desirable combustion resistance and tensile properties and superior load-bearing characteristics.

These and other objects of the invention will be apparent from the description of the invention set forth hereinafter.

SUMMARY OF THE INVENTION

A principal aspect of the present invention is predicated on the discovery that stable polymer/polyols may be obtained which are capable of being converted to scorch-free polyurethanes having desirable combustion resistance while retaining satisfactory tensile properties by preparing the polymer/polyol with techniques that suitably alter the structure of the polymer portion of the polymer/polyol. More particularly, it has been discovered that the tensile properties of the polyurethane are directly related to the intrinsic viscosity of such polymer portion. The polymer/polyol preparative technique may be accordingly adjusted to provide a polymer portion having the desired intrinsic viscosity, allowing some advance predictability of the tensile properties upon conversion to a polyurethane.

It is particularly surprising that adjustment of the polymer structure can achieve these effects since it has not heretofore been appreciated that the polymer structure could, and would, affect the ultimate physical properties of the polyurethane. Stated another way, while the polymer portion can, of course, positively affect the physical properties of a polyurethane in nondestructive tests such as are involved in determining load-bearing characteristics, it was not heretofore appreciated that the polymer structure could affect in any way the physical properties in destructive tests, such as are involved in determining the tensile properties of a polyurethane foam.

A further aspect of this invention is predicated on the discovery that white, stable polymer/polyols capable of imparting desirable load-bearing characteristics may be prepared which are characterized by relatively low viscosities. Indeed, in accordance with a more specific aspect of this invention, the preparative technique may be tailored to maximize the polyurethane combustion resistance and tensile property characteristics; and, thereafter, the resulting polymer/polyol may be treated to reduce the viscosity to, if desired, essentially the minimum for the specific stable dispersion involved. Alternatively, by appropriate selection of the type and amount of a polymer control agent, as will be more fully discussed hereinafter, the polymer/polyol may be prepared with the polymer portion having the desirably low crosslinking coefficient and relatively high intrinsic viscosity while still providing a product viscosity of essentially the minimum for the specific stable dispersion involved.

Yet another aspect of the present invention provides stabilizer precursors which assist in providing polymer/polyols having the desirable characteristics described herein. More particularly, such stabilizer precursors are provided which have relatively low viscosities and possess highly desirable storage stability.

These aspects will be more particularly described in the detailed description of the present invention.

DETAILED DESCRIPTION OF THE INVENTION

Combustibility Resistance—Tensile Property Considerations

As disclosed in U.S. Pat. No. 4,463,107 to Simroth et al., the combustionability of polymer/polyol-based polyurethane foams is attributable to the structural properties of the polymer portion of the polymer/polyol composition. More particularly, the degree of crosslinking of such polymer portion affects the combustion resistance of the resulting polyurethane product. In general, a polymer with a low degree of crosslinking provides a polyurethane product having greater combustion resistance.

Further, the degree of crosslinking of the polymer is a function of the many process variables involved. These process variables include the catalyst concentration, the residence time, the ratio of acrylonitrile to the other polymerizable ethylenically unsaturated monomers employed and if used the concentration of chain transfer agents.

The degree of crosslinking of the polymer in a polymer/polyol dispersion is expressed in terms of the crosslinking coefficient. The crosslinking coefficient (XLC) is defined as follows:

$$XLC \text{ equals } 100-LT$$

wherein LT is the light transmission of a dispersion or solution of the polymer/polyol in dimethylformamide (DMF), and is determined in accordance with the procedure set forth in U.S. Pat. No. 4,463,107 (at column 2, line 60, et seq.).

Insofar as the combustion resistance of the polyurethane product is concerned, while a polymer characterized by a crosslinking coefficient of less than 55 has been found to impart improved combustion resistance to polyurethane foams, it is generally desirable to further reduce the degree of crosslinking in the polymer. Accordingly, it is preferable to provide polymers characterized by a crosslinking coefficient of not greater than about 20, more preferably not greater than about 10 and most preferably not greater than about 5. A crosslinking coefficient of about zero (0) is, of course, desirable and can be readily achieved. An expedient method for achieving the desired crosslinking coefficient resides in the utilization of a polymer control agent, as will be described more fully hereinafter in a subsequent section.

It has been discovered, that, in efforts to minimize the degree of crosslinking in the polymer and, thus to improve the combustion resistance of the resulting polyurethane product, the polymer portion of the dispersion may be affected in such a way that the tensile properties (that is, the tensile and tear strengths and elongation) of the resulting polyurethane product can suffer. Thus, a decrease in the tensile properties of the resulting foams has been observed in polyurethanes prepared from polymer/polyols which themselves were prepared, for example, where a high level of a chain transfer agent was used, where a high level of catalyst was used or where the temperature at which the polymerization was carried out was relatively high. Neither the reasons for this phenomenon nor the mechanism of the polymerization are, at present, completely understood.

Regardless of the phenomenon and the particular mechanism involved, and in accordance with one aspect of the present invention, it has been found that the tensile properties of the polyurethane products are directly related to the structure of the polymer portion of the polymer/polyol. The polymer structure can be desirably characterized by the intrinsic viscosity of the polymer. Thus, by suitably controlling the process variables during the preparation of the polymer/polyol dispersion such that the polymer of the dispersion has a certain minimum intrinsic viscosity, the desired tensile properties of the polyurethane products can be retained.

The intrinsic viscosity of the polymer is measured by techniques well known to those skilled in the polymer art. The polymer is first separated from the polymer/polyol by a solvent extraction technique. The extracted polymer is then dried overnight in a vacuum at ambient temperature. Next, the solution viscosity of the polymer in dimethylformamide (DMF) is measured at 30° C. at several low concentrations, for example, at concentrations of less than one (1) percent or so. The intrinsic viscosity is then determined by extrapolation of the measured viscosities to zero polymer concentration. The specific test procedure will be described in detail hereinafter in conjunction with the Examples.

For polyurethane foams made using a high total solids (at least about 30 to 35 wt. percent or more), high styrene (about 70%) polymer/polyol, for example, it is generally desired that the foam have tensile properties on the order of about 2.8 for tear, about 30 for tensile strength and about 85 for elongation. To achieve these properties with a polymer/polyol of that type, the intrinsic viscosity of the polymer as measured by the intrinsic viscosity test set forth should be at least about 0.55, preferably at least about 0.62, and even more preferably at least about 0.65. In general, the tensile properties of the foam are directly related to the intrinsic viscosity of the polymer such that, as the intrinsic viscosity increases, there is an increase in the tensile properties of the foam. Thus, it is preferable that the intrinsic viscosity of the polymer be as high as is possible and values up to 0.8 and even higher are accordingly desirable.

As noted above, the desired intrinsic viscosity of the polymer portion of the polymer/polyol dispersion may be achieved by appropriately varying the reaction parameters during the polymer/polyol preparation. Important parameters are the catalyst concentration, the use of a polymer control agent, including its type and concentration, residence time, and reaction temperature. Any or all of the process parameters may be suitably adjusted to provide the desired intrinsic viscosity of the polymer. The process parameters appear to interact in such a manner that no one individual parameter is critical in attaining the necessary intrinsic viscosity. Stated another way, the selection of the level of any individual parameter will depend upon the values selected for the other parameters; and the combined parameters must be selected so as to achieve the desired polymer intrinsic viscosity. Such results may be obtained by adjusting the catalyst concentration, by adjusting the reaction temperature and by the utilization of a suitable polymer control agent, as will be more particularly described hereinafter.

The polymer portion of the polymer/polyol compositions of the present invention must thus achieve an appropriate balance between crosslinking coefficient and intrinsic viscosity in order to provide polyurethane products having the desired and superior combustion resistance while retaining satisfactory tensile properties as well. Achieving this balance may be accomplished by adjusting the process parameters as discussed herein to provide the polymer portion with a crosslinking coefficient of about 55 or lower, more desirably about 20 or lower, and an intrinsic viscosity of at least about 0.30, desirably 0.55 or higher.

Base Polyol

The polyol or blends thereof, employed as the base polyol depends upon the end use of the polyurethane product to be produced. The molecular weight or hydroxyl number of the base polyol may thus be selected so as to result in flexible, semi-flexible, or rigid foams or elastomers when the polymer/polyol produced from the base polyol is converted to a polyurethane. The hydroxyl number of the polyol or polyols employed can accordingly vary over a wide range. In general, the hydroxyl number of the polyols employed may range from about 20 (and lower) to about 150 (and higher).

For example, when foams are to be prepared, the molecular weight or the hydroxyl number may be selected to result in flexible, semi-flexible, or rigid foams. The polyols in this instance preferably possess a hydroxyl number of at least 150 for rigid foams, from about 50 to about 150 for semi-flexible foams, and from about 20 to about 70 for flexible foams. As a further refinement, the specific foam application will likewise influence the choice of base polyol. As an example, for molded foam, the hydroxyl number of the base polyol may be on the order of about 20 to about 40, and for slabstock the hydroxyl number may be on the order of about 25 to about 60.

As a further example, for elastomer applications, it will generally be desirable to utilize relatively high molecular weight base polyols having relatively low hydroxyl numbers, e.g., 20 to 50 or so.

The hydroxyl number limits described above are not intended to be restrictive, but are merely illustrative of the large number of possible combinations for the polyol or polyols used.

The hydroxyl number is defined as the number of milligrams of potassium hydroxide required for the complete hydrolysis of the fully phthalated derivative prepared from one gram of polyol. The hydroxyl number can also be defined by the equation:

$$OH = (56.1 \times 1000 \times f)/m.w.$$

where

OH = hydroxyl number of the polyol
f = functionality, that is, average number of hydroxyl groups per molecule of polyol
m.w. = number average molecular weight of the polyol.

Substantially any of the polyols previously used in the art to make polymer/polyols can be used as the base polyol in this invention. Illustrative of the polyols useful in producing polymer/polyol compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) alkylene oxide adducts of polyhydroxyalkanes;
(b) alkylene oxide adducts of nonreducing sugars and sugar derivatives;
(c) alkylene oxide adducts of phosphorus and polyphosphorus acids;
(d) alkylene oxide adducts of polyphenols;
(e) the polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-dihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glycoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, and novolac resins; condensation products of various phenolic compounds and acrolein; the simplest member of this class being 1,2,3-tris(hydroxyphenyl) propanes, condensation products of various phenolic compounds and glyoxal, glutaraldehyde, and other dialdehydes, the simplest members of this class being the 1,1,2,2-tetrakis (hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

Indeed, any material having an active hydrogen as determined by the Zerewitinoff test may be utilized as the base polyol. For example, amine-terminated polyether polyols are known and may be utilized, if desired.

The most preferred base polyols employed in this invention include the poly(oxypropylene) glycols, triols, and higher functionality polyols, and the like that are capped with ethylene or propylene oxide as dictated by the reactivity requirements of the particular polyurethane application. Generally, the nominal functionality of such polyols will be in the range of about 3 to 4 or so. These polyols also include poly(oxypropylene-oxyethylene) polyols; however, desirably, the oxyethylene content should comprise less than 80 percent of the total and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polymer chain.

As is well known in the art, the polyols that are most preferred herein contain varying small amounts of unsaturation. Unsaturation in itself does not affect in any adverse way the formation of the polymer/polyols in accordance with the present invention except in the case where the extent or type of unsaturation is so high as to result in a highly crosslinked polymer/polyol or gel.

Monomers Used

Conceptually, a wide variety of monomers may be utilized in the preparation of the polymer/polyol compositions in accordance with the invention. Numerous ethylenically unsaturated monomers are disclosed in the prior patents. Any of these monomers should be suitable.

The selection of the monomer or monomers used will depend on considerations such as the relative cost of the monomers and the polyurethane product characteristics required for the intended application. To impart the desired load-bearing to the foams, the monomer or monomers used in preparing the polymer/polyol should, of course, desirably be selected to provide a polymer which has a glass transition of at least slightly higher than room temperature. Exemplary monomers include styrene and its derivatives, acrylates, methacrylates such as methyl methacrylate, acrylonitrile and other nitrile derivatives such as methacrylonitrile, and the like. Vinylidene chloride may also be employed.

The monomer mixture desirably used in preparing the polymer/polyols of this invention includes acrylonitrile in an amount up to about 75 weight percent based on the weight of the polymer, more typically up to about 45 weight percent or so. Acrylonitrile is employed because it tends to form polymer/polyol compositions stable to phase separation. Any other polymerizable ethylenically unsaturated monomer may be used as a comonomer or as comonomers.

The preferred monomer mixtures used to make the polymer/polyol compositions of this invention are mixtures of acrylonitrile and styrene. The weight proportion of acrylonitrile can range from about 0.5 to 75 weight percent of the comonomer mixture, more typically up to about 45 weight percent or so, and styrene can accordingly vary from about 99.5 to about 25 weight percent of the mixture. An acrylonitrile to styrene ratio in the monomer mixture of from about 25:75 to 45:55 is particularly preferred, even more particularly about 30:70. Styrene contents of about 65 percent or more in such monomer mixtures should provide highly stable polymer/polyols useful for scorch-free applications.

As the amount of styrene in the monomer mixture is increased above about 70 weight percent or so, it becomes increasingly more difficult to make satisfactorily stable polymer/polyols, although the combustion resistance of the foam is improved somewhat. Additionally, at such high styrene levels, problems other than stability are also typically encountered. These problems include a decrease in conversion of the styrene monomer and the concomitant need to adequately strip the styrene monomer, as well as an increase in the viscosity of the polymer/polyol.

Despite these drawbacks, levels of styrene greater than 75 weight percent and even as high as 100 weight percent may be desirable. For example, it has been found that foams made using such polymer/polyols have satisfactory tensile properties at a much lower polymer intrinsic viscosity (as measured by the test set forth herein) than is possible for polymer/polyols in which the acrylonitrile/styrene ratio is less than 25:75. For example, a polymer intrinsic viscosity as low as about 0.30, more desirably 0.40, and even more desirably, 0.50, should provide acceptable tensile properties in foams made from such high styrene-containing polymer/polyol.

As has been discussed herein, the present invention is, in accordance with one aspect, predicated upon the discovery that there is a direct relationship between the tensile properties of the resulting polyurethanes and the intrinsic viscosity of the polymer portion of the polymer/polyol used in preparing the polyurethanes. Further, the trend is for the tensile properties to improve as the intrinsic viscosity of the polymer portion is increased.

This relationship will hold true for any monomer system utilized in preparing the polymer/polyol. However, the minimum absolute intrinsic viscosity value needed to provide specific and desired tensile properties will vary with significant changes in the monomer mixture used, due to the changing polymer-solvent interaction in the analytical method. This is evident from the intrinsic viscosity levels discussed herein for the relatively high styrene systems in comparison to lower styrene systems. The useful intrinsic viscosity for the polymer formed from any particular monomer mixture may be readily determined by ascertaining the value needed to impart the desired tensile properties. Functionally, the polymer portion should have an intrinsic viscosity high enough to provide the desired tensile properties.

The monomer content will be typically selected to provide the desired solids content required for the anticipated end-use application. In general, it will usually be desirable to form the polymer/polyols with as high a resulting polymer or solids content as will provide the desired viscosity and stability properties. The present invention is highly desirable for preparing polymer/polyols having solids contents in excess of 25 or 30 percent by weight, based upon the weight of the polymer/polyol composition, up to about 60 percent by weight or even more.

For molded foam applications, typically high resiliency formulations, solids content of up to about 30 weight percent or more are feasible and may be provided utilizing the present invention. In slabstock applications, the tendency is to utilize as high a solids content as possible, contents of 35 weight percent up to about 40 weight percent or more being desired commercially for some applications.

Stabilizer Precursors

Stabilizer precursors may be used, if desired, in the preparation of the polymer/polyols of this invention to assist in imparting desired stability to the resulting polymer/polyols. Suitable stabilizer precursors are, in general, prepared by the reaction of the selected reactive unsaturated compound with the selected polyol.

By the terminology reactive unsaturated compound, it is meant any compound capable of forming an adduct with a polyol, either directly or indirectly, and having carbon-to-carbon double bonds which are adequately reactive with the particular monomer system being utilized. More specifically, compounds containing alpha, beta unsaturation are preferred. Suitable compounds satisfying this criteria include the maleates, fumarates, acrylates, and methacrylates. While not alpha, beta unsaturated compounds, polyol adducts formed from substituted vinyl benzenes such as chloromethylstyrene may likewise be utilized. Illustrative examples of suitable alpha, beta unsaturated compounds which may be employed to form the stabilizer precursor include maleic anhydride, fumaric acid, dialkyl fumarates, dialkyl maleates, glycol maleates, glycol fumarates, isocyanatoethyl methacrylate, methyl methacrylate, hydroxyethyl methacrylate, acrylic and methacrylic acid and their anhydride, methacroyl chloride and glycidyl methacrylate.

With respect to the polyol reactant, any of the polyol types used for the base polyol may be employed. It is preferred to utilize polyoxyalkylene polyols. The molecular weight of the polyol utilized should be relatively high, preferably above about 4000 (number average) and, more preferably, at least about 4500. However, polyols having molecular weights of no less than about 3000 may be utilized if desired.

The level of ethylenic unsaturation in the stabilizer precursor may vary widely. The minimum and maximum levels of unsaturation are both constricted by the dispersion stability that the stabilizer precursor is capable of imparting to the polymer/polyol composition. On the one hand, the minimum level of unsaturation is the level sufficient to permit the stabilizer precursor to assist in the dispersion stability of the polymer/polyol. Typically, the lower limit of unsaturation is about 0.03 or so millequivalents per gram of precursor.

On the other hand, the maximum level is constricted by crosslinking of the stabilizer precursor which may occur. More particularly, when higher levels of unsaturation are attempted to be added in preparing the stabilizer precursor, there is a greater probability that species will be formed having more than one double bond per molecule. An undue population of such specie may cause crosslinking and thus adversely affect the ability of the stabilizer to provide the requisite dispersion stability enhancement, as well as substantially increasing the viscosity. Accordingly, the maximum level of unsaturation added should be below that at which significant crosslinking occurs, that is, on the average no more than about one carbon-to-carbon double bond per molecule of stabilizer precursor should occur.

The specific level of unsaturation utilized will further depend on the molecular weight of the polyol used to prepare the stabilizer precursor and on the viscosity of the stabilizer precursor itself. Thus, from less than about 0.02 milliequivalents per gram of precursor up to about 0.15, or perhaps up to about 0.20 or more may be used. More particularly, unsaturation levels of at least about 0.04 or 0.05, up to about 0.10 or so are particularly suitable.

It is preferred to prepare the stabilizer precursor in such a fashion that the unsaturation is retained to the extent possible. The use of such stabilizer precursors are particularly useful in improving polymer/polyol stability.

Loss of unsaturation may occur in stabilizer precursor preparation with any of the alpha, beta unsaturated compounds. For example, it has been recognized that when maleic anhydride is employed anywhere from about 25 percent to essentially all of the unsaturation may be lost. Loss in unsaturation appears to be generally accompanied by an increase in viscosity of the stabilizer precursor. It is accordingly desirable to utilize an efficient process in the preparation of the precursor such that at least half of the added unsaturation is retained.

Preferably, the unsaturation is of the fumarate type. It is accordingly preferred to utilize a compound having fumarate-type unsaturation or an unsaturated compound which, under the reaction conditions used in forming the adduct with the polyol, will form a high proportion of fumarate-type unsaturation. Likewise, under appropriate conditions, maleate-type unsaturation can be isomerized to fumarate, as is known.

The formation of the stabilizer precursor using maleic anhydride may be carried out at elevated temperatures utilizing appropriate catalysts. It has been found satisfactory to maintain the ratio of the maleic anhydride to polyol in the range of from about 0.5 to perhaps about 1.5 moles of maleic anhydride per mole of polyol, more preferably 0.75 to about 1.00 mole per mole of polyol.

The stabilizer precursor preparation is preferably carried out in the presence of a catalytic amount of a strong base. Suitable bases include inorganic bases such as alkali and alkaline earth metal hydroxides and the weak acid salts of alkali and alkaline earth metals, and organic bases such as quaternary ammonium hydroxides, 4-dimethylaminopyridine, 4-pyrrolidinopyridine, and imidazole. Potassium hydroxide has been found to be useful. The amount of catalyst is not critical; and may, for example, be as low as about 6 p.p.m. or even less when potassium hydroxide is used.

Suitable reaction temperatures may vary from about 100 to 125° C. or so up to about 180° C. or even higher. Desirably, the reaction should be carried out in a reactor capable of agitation and subsequent pressurization. It is necessary to introduce an alkylene oxide, preferably ethylene or propylene oxide, either with the other reactants or subsequently, which is reacted with the adduct until the acid number is below at least about 3.0, preferably below about 1.0. The product may then be cooled and stripped to remove excess alkylene oxide and is then ready for use in preparing polymer/polyols.

When maleic anhydride is employed, stabilizer precursors having adequate viscosities can be prepared by utilizing catalytic amounts of (e.g., 20 parts per million or so) of a strong base such as potassium hydroxide. This will likewise allow retention of about 50 percent of the unsaturation, with up to about 70 percent or so of the unsaturation being of the fumarate type under appropriate reaction times and conditions. Viscosities of about 3000 cks. (25° C.) or so are typically provided.

The maximum viscosity of useful stabilizer precursors will be typically dictated by practical considerations. More specifically, the viscosity of the stabilizer precursor should not be so high that it cannot be conveniently handled. Viscosities up to perhaps 10,000 to 15,000 cks or so should be capable of being satisfactorily handled. Moreover, by blending with base polyol in the reactor used to form the stabilizer precursor, even substantially higher viscosities (e.g., up to 25,000 to 30,000 cks. or higher) should be suitable.

Stabilizer precursors employing polyoxypropylene oxide addition products with starters having functionalities in excess of 3 are preferred. A variety of tetrols and higher functionality starters are well known and may be used. Mixtures may likewise be employed. It is particularly preferred to utilize sorbitol as a starter. Such stabilizer precursors are further characterized by an hydroxyl number of about 28, unsaturation of the fumarate type and a level of unsaturation of about 0.06 or even 0.05 or so, to 0.1 milliequivalents unsaturation or so per gram of polyol. The stabilizer precursor accordingly may be made by reacting the sorbitol-initiated polyol with maleic anhydride in the presence of potassium hydroxide catalyst. This may be accomplished by using a temperature of about 125° C. to preserve a high proportion of the charged (i.e.—added) unsaturation. The maleate unsaturation may then be isomerized to fumarate using morpholine as is well known. Alternatively, higher temperatures (e.g.—175° to 180° C. or so) may be utilized to achieve relatively high levels of fumarate-type unsaturation directly. The techniques involved are well known and may be used as desired.

The use of the preferred stabilizer precursors offers several advantages. The utilization of high functionality starters, such as, for example, sorbitol, provide highly effective, yet relatively low viscosity, stabilizer precursors, which, in turn, allows the polymer/polyol viscosity to be minimized. Similarly, stability of stabilizer precursors can be problemmatical, sometimes resulting in marked viscosity increases upon usage. This may well be due to reaction of stabilizer precursor molecules with each other. The utilization of propylene oxide-capped precursor stabilizers substantially minimizes this problem.

A stabilizer, as previously described, may be added to the base polyol in an amount sufficient to provide the desired stability assistance for the resulting polymer/polyol. It will generally be suitable to incorporate a stabilizer in amounts up to perhaps about 20 percent or so, based upon the weight of the polyol. Levels from about 3 to 5 percent to about 17 percent by weight or so should generally be satisfactory for slabstock applications, while levels of about 12 percent by weight or less should be suitable for polymer/polyols used in high resiliency molded foam applications. If desired, a mixture of stabilizers can, of course, be used.

Polymer/Polyol Preparation

The polymer/polyols of this invention are produced by polymerizing the monomer system used in the presence of a free radical catalyst in the base polyol and, if used, a stabilizer precursor.

The polymer/polyols of the present invention are preferably prepared utilizing the process set forth in the previously identified Priest et al. patent. In accordance with that process, a low monomer-to-polyol ratio is maintained throughout the reaction mixture during the polymerization process. Such low ratios are achieved by employing process conditions that provide rapid conversion of monomer to polymer. In practice, a low monomer-to-polyol ratio is maintained, in the case of semi-batch and continuous operation, by use of a free radical polymerization catalyst, by control of the temperature and mixing conditions and, in the case of semi-batch operation, by slowly adding the monomers to the polyol.

The mixing conditions employed are those attained using a back-mixed reactor (e.g., a stirred flask or stirred autoclave). Reactors of this type keep the reaction mixture relatively uniform and so prevent localized high monomer-to-polyol ratios. However, tubular reactors may be employed if they are modified so that increments of the monomer are added to various stages.

The utilization of the Priest et al. process is preferred since this allows the preparation of polymer/polyols with a wide range of monomer composition, polymer contents, and base polyol that could not be otherwise prepared with the necessary stability now often desired. However, whether the utilization of the Priest et al. process is essential depends upon whether the process parameters are such that a satisfactory polymer/polyol can be prepared without using this process.

Other processing technology is disclosed in the prior art and may likewise be used in the preparation of the polymer/polyols of the present invention. For example, the techniques set forth in U.S. Pat. No. 4,119,586 to Shah may be employed, if desired.

Control of residence time has been found useful in controlling both the degree of crosslinking (XLC) and the intrinsic viscosity of the polymer. In a continuous operation, a stable dispersion of a polymer in a polyol is produced where the residence time, which is defined as that time calculated by dividing the reactor's volume by the volumetric flow rate of the total feed to the reactor, is from about 1 minute to about 5 hours, and preferably, from about 10 minutes to about 2 hours.

In a semi-batch operation where the reactor can be partially charged prior to initiating polymerization, the term residence time refers to that period of time during which significant polymerization between the acrylonitrile and the co-monomer(s) occurs. In semi-batch operation, residence times from about 30 minutes to about 10 hours are recommended.

Catalysts useful in producing the polymer/polyol compositions of this invention are the free radical-type, vinyl polymerization catalysts such as the peroxides, percarbonates, and the azo compounds. Any other suitable catalyst may be employed. Azo catalysts such as azobis (isobutyronitrile) are the preferred catalysts. 2,2'-azobis (isobutyronitrile) is particularly preferred because it does not increase the acid number of the product, does not impart objectionable odor to the product, and does not require special handling, particularly as compared to certain peroxide catalysts.

The catalyst concentration will affect both the degree of crosslinking in the polymer and the intrinsic viscosity of the polymer, but can be varied within reasonably wide limits. The catalyst concentration will accordingly typically be adjusted to optimize both these properties. Accordingly, the concentration will generally be in the range of from about 0.1 to about 3 weight percent based on the total feed to the reactor. The preferred amount of catalyst for optimizing the intrinsic viscosity of the polymer will be in the range of about 0.2 weight percent to about 1.0 weight percent. Up to a certain point, increases in the catalyst concentration result in increased monomer conversion, but further increases do not substantially increase conversion. Conversions of monomers to polymers which can be typically achieved are on the order of 85% to 98% of the monomer charged. On the other hand, increasing catalyst concentration increasingly improves product stability. The catalyst concentration selected will usually be an optimum value considering all factors, including costs.

The temperature used in producing polymer/polyol compositions in accordance with the invention is not in itself critical and can be any temperature at which the selected catalyst has a reasonable rate of decomposition under the reaction conditions. Typically, in continuous processes, reaction temperatures of from about 100° C. to about 150° C. may be used, the preferred range being from about 100° C. to about 125° C. It has been found that with higher reaction temperatures there is a tendency for the intrinsic viscosity of the polymer to decrease. Accordingly, lower temperatures are preferred, typically in the range from about 105° C. to about 125° C.

Further, the addition of a polymer control agent during the polymerization reaction has been found to be useful. In general, as used herein, the terminology polymer control agent connotes a low molecular weight liquid which, upon use in preparing the polymer/polyol, results in polymer structure such that the polymer has the desired low crosslinking coefficient and intrinsic viscosity characteristics. Virtually any low molecular weight liquid should be suitable. A variety of low molecular weight carbon-hydrogen compounds are known and may be employed. The suitability of a particular liquid may be readily determined simply by employing the liquid in the polymer/polyol preparation. Accordingly, low molecular weight liquids may be employed regardless of whether any significant chain transfer activity is exhibited.

Low molecular weight liquids not conventionally viewed as chain transfer agents but useful as polymer control agents include water, cyclohexane, and benzene. Suitable polymer control agents which are conventionally viewed as chain transfer agents include ketones, alcohols, aldehydes, halogenated compounds, benzene derivatives and the like.

Any such known chain transfer agents other than mercaptans can be utilized as the polymer control agents, if desired. The malodorous character of alkyl mercaptans makes utilization in polyurethanes undesirable. The polymer/polyol preparation should accordingly be carried out in the essential absence of mercaptans, viz.—the use of mercaptans in amounts that would cause such odor problems should thus be avoided. Preferably, no such mercaptan is used whatever. Alternatively, an extremely small amount may be tolerated if undue odor problems are not created. Stated differently, if such small amounts of mercaptans are used, another polymer control agent, other than a mercaptan, should also be employed.

The specific polymer control agent utilized is not critical insofar as providing the desired crosslinking coefficient of the polymer portion of the polymer/polyol is concerned. However, the polymer control agent selected and the amount utilized must be carefully chosen so that the polymer formed possesses the desired intrinsic viscosity.

These objectives may be satisfied in several ways. It is thus suitable to utilize a sufficiently high concentration of a polymer control agent exhibiting what would be considered as minimal chain transfer activity, such as methanol, or no chain transfer activity whatsoever (in the normally accepted sense), such as water or benzene.

Likewise, it is also suitable to utilize a medium level concentration of a conventional chain transfer agent such as isopropanol or the like which is considered to have moderate chain transfer activity. It is further possible to utilize a relatively low amount of a high chain transfer activity agent. For example, a ketone such as methyl ethyl ketone should be suitable. Mixtures of polymer control agents may likewise be used. In such instances, the relative concentrations of each component thereof must be appropriately adjusted.

The polymer control agent or agents used should thus be added in an amount that will provide a polymer having the desired intrinsic viscosity. Suitable levels will, of course, vary as discussed herein. Amounts up to 20 weight percent or higher, based on the total feed to the reactor, may be used satisfactorily. More typically, useful levels will be about 5 to 10 percent or so.

The viscosity of the polymer/polyol compositions can vary over a wide range, depending upon the limitations and requirements of the particular end use application. As a practical matter, it is generally desired to minimize the viscosity for obvious reasons. When the viscosity gets too high, it becomes difficult to handle the polymer/polyol, particularly in off-loading, mixing, and the like. In general, it is desired that the viscosity of the resulting polymer/polyol be less than about 10,000 cps at 25° C.

The viscosity of the resulting polymer/polyols will also typically vary depending upon the intended polyurethane application. In high resiliency molded foam applications where solids contents on the order of 20 to 30 weight percent or so are often used (typically diluted with conventional polyols in commercial formulations), the viscosities of the thus-diluted polymer/polyols will typically be in the 3500 to 5000 cps (25° C.) range or higher. In slabstock applications where solids contents of 35 to 60 percent by weight or more are desired and the polymer/polyols are sometimes used neat, the viscosity will typically be above about 3500 cps (25° C.) or so, often ranging from about 6500 to 8000 cps (25° C.) or so.

Viscosity Control

For a given polymer/polyol system, adjustment of the process variables to provide the desired polymer crosslinking coefficient and intrinsic viscosity can result in polymer/polyol compositions having higher than the indigenous viscosity for the particular system, viz.—the minimum product viscosity for a given polymer/polyol composition made under the particular reaction conditions. This may occur, for example, where the level of the polymer control agent having at least moderate chain transfer activity (e.g.—isopropanol) is minimized in order to achieve the desired polymer intrinsic viscosity. The desired product viscosity of such polymer/polyol compositions can thus be significantly higher than the indigenous viscosity for the system.

It has been discovered that product viscosities of essentially the indigenous system viscosity can be provided by either of two general methods. For example, suitable treatment can result in reduction in a product viscosity from about 5,000 centipoise to about 4,000 centipoise or so, the latter considered to be the indigenous system viscosity. This reduction in product viscosity is accompanied by an observed change in the somewhat rough surfaces of the polymer particles to a predominance (i.e.—at least a majority) of particles appearing to have relatively smooth exteriors.

Thus, in accordance with another aspect of the present invention, the polymerization of the monomers in the polyol is carried out in the presence of a polymer control agent having at most minimal chain transfer activity. Exemplary polymer control agents of this type include water, methanol, cyclohexane and benzene.

This preparative technique allows the polymer/polyol to be prepared with what is considered to be its indigenous system viscosity. Yet, the polymer portion by use of this technique possesses the desirably low crosslinking coefficient and an acceptably high intrinsic viscosity. This is in sharp contrast to what occurs when the polymer control agent employed has moderate or high chain transfer activity. Under these latter circumstances, it is generally quite difficult to satisfy all three objectives. The reason for this surprising behavior when minimal chain transfer activity materials are used as the polymer control agent is simply not understood. Regardless, this technique is considered to be highly useful, providing a facile method for readily providing optimum characteristics for the polymer and for the polymer/polyol product viscosity.

In accordance with a further aspect of this invention, the polymer/polyol composition prepared with higher than its indigenous system viscosity may be subjected to a post treatment to increase the polymer particle fluidity sufficiently to concomitantly cause the desired reduction in product viscosity to essentially its indigenous system viscosity. This post treatment can be carried out by utilizing a heat treatment, by using a solvating agent for the polymer particles, or by using a combination of the two.

The reduction in product vlscosity resulting from the heat treatment is believed to be the result of the lowering of the melt viscosity of the polymer in the dispersed polymer particles to such an extent that the surface force (surface tension) associated with a particle is sufficient to cause the molten polymer in the particle to flow into the shape of lowest energy—a smooth sphere. Likewise, the use of a solvating agent, used alone or in conjunction with use of a higher temperature, is believed to reduce the melt viscosity of the polymer in the particles by a plasticization mechanism, thereby enabling the polymer in the particle to flow towards a smooth spherical shape.

The general concept is to increase the fluidity of the polymer within the particles to obtain at least a predominance of smooth particles with a concurrent reduction in product viscosity. Any technique capable of increasing the fluidity of the polymer particles may be used in addition to the techniques discussed herein.

The post-heat treatment comprises heating the polymer/polyol composition (e.g—to a temperature somewhat higher than the polymerization temperature) for a period of time sufficient to increase the fluidity of the polymer particles, thereby reducing the product viscosity to essentially the indigenous system viscosity. The period of time required may vary from a few minutes or so up to about one hour or more. This post-heat treatment technique, when a continuous, two stage process is employed for the polymer/polyol preparation, can be desirably carried out in the second stage, thereby obviating the need for a separate step. In a semi-batch process, the requisite heat treatment can be carried out in the reactor following completion, or at least towards the completion, of the polymer/polyol preparation.

The post treatment can likewise be carried out, as previously mentioned, by subjecting the polymer/polyol composition to treatment with a solvating agent. For example, after completion of the polymer/polyol preparation, the solvating agent can be added and the resulting mixture refluxed until completion of the treatment. Any material whose solubility parameters are similar to those of the polymer portion of the polymer/polyol may be suitably utilized as the solvating agent. For example, with the preferred acrylonitrile-styrene copolymers, ethyl benzene may be employed as the solvating agent.

It will obviously be more desirable to carry out these viscosity reduction techniques in such a fashion that essentially the indigenous system viscosity is provided, due to the relative ease with which such techniques can be effected and the advantages derived from lower product viscosity polymer/polyols. Of course, it is likewise within the scope of the present invention to carry out such techniques so as to only reduce the product viscosity to a point between the starting product viscosity and the indigenous system viscosity.

Utilization of a polymer control agent having significant chain transfer actility often tends to decrease the stability of the polymer/polyol composition, apparently because of the competition during polymerization between the chain transfer agent and the grafting reaction between the growing polymer chain and the base polyol. Accordingly, it may be desirable to include in the polymerization reaction, a stabilizer precursor. The utlzation of a stabilizer precursor seems to minimize the adverse effects caused by use of this type of polymer control agent. The amount of the stabilizer precursor employed may be varied within wide limits. Functionally, the level used should be sufficient to adequately minimize adverse effects caused by use of relatively high chain transfer activity polymer control agents. Typically, this may be achieved by utilizing up to about 10 weight percent or so of the stabilizer precursor, based on the weight of the base polyol.

Polymer/Polyol Stability

From the functional standpoint, suitable polymer/polyols must be capable of being: (1) made, (2) stored, (3) shipped, and (4) used without undue loss of polymer content or damage or fouling of the equipment in which it is made and handled. If a polymer/polyol meets these functional criteria, it is generally considered to be satisfactorily stable.

An indication of the stability can be provided by the filtration and centrifugibility performance, which will be more fully discussed in conjunction with the working Examples. The filtratiqn characteristics are determined by passing a sample of the polymer/polyol by gravity, through a 150-mesh wire screen. The most stable polymer/polyols will pass completely through the screen (i.e., over 99 weight peHcent).

Stability is also confirmed by the amount of material (cake) which is thrown down from samples placed in laboratory centrifuges. This is, in effect, an accelerated settling test, primarily indicative of storage stability. In general, the lower the amount of centrifugable solids obtained, the more stable is the polymer/polyol. For most applications, satisfactory storage stability will be provided when the centrifugable solids level is less than about 20, preferably less than about 10 weight percent of the total polymer/polyol.

Polyurethane Preparation

The present invention also provides a method for producing polyurethane products which includes reacting: (a) a polymer/polyol composition of this invention, and (b) an organic polyisocyanate in the presence of (c) a catalyst for the reaction of (a) and (b) to produce the polyurethane product. When a foam is being prepared, the reaction is carried out in the presence of a blowing agent and a foam stabilizer. The reaction and foaming operations can be performed in any suitable manner, preferably by the one-shot technique.

The polymer/polyol may, if desired, be blended with conventional polyols or the like to reduce the polymer content to the level required for the particular end-use application. Blends in which the resulting polymer content is as low as 4 percent of the total weight of the blend, or even less, are useful.

The organic polyisocyanates that are useful in producing polyurethane products in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly(phenylene isocyanates). Examples of suitable polyisocyanates are 2,4'-diisocyanatotoluene, 2,6-diisocyanatotoluene, methylene bis(4-cyclohexyl isocyanate), 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3- isocyanatopropyl)ether, bis(3-isocyanatopropyl) sulfide. 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethypentane, 1,9-diisocyanatononane, 1,10-disocyanatopropyl)ether of 1,4-butylene glycol, 1,11-diisocyanatoundecane, 1,12-diisocyanatododecane bis-(isocyanatohexyl) sulfide, 1,4-diisocyanatobenzene, 2,4-diisocyanatotolylene, 2,6-diisocyanatotolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene,2,5-diisocyanato-1-nitrobenzene, 4,4-diphenylmethylene diisocyanate, 3,3-diphenyl-methylene diisocyanate, and polymethylene poly (phenyleneisocyanates), and mixtures thereof. The preferred polyisocyanate is about 80% of a mixture of 80% 2,4-tolylene diisocyanate and 20% 2,6-tolylene diisocyanate and about 20% of a polymeric isocyanate.

Any known catalysts useful in producing polyurethanes may be employed. Representative catalysts include: (a) tertiary amines such as bis(2,2'-dimethylaminoethyl)ether, trimethylamine, triethylamine, N-methylmorpholiqe, N-ethylmorpholine, N,N-dimethylbenzylamine, N-N-dimethylethanolamine, N,N,N',N'-tetramethyl-1,3-butanediamine, triethanolamine, 1,4-diazabicyclo-[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chldride, stannous chloride, antimony trichloride, oismuth nitrate and chloride, and the like; (e) chelates of various metals such as those which can be obtained from acetylacetone, benzoylacetone, triflouroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2(N,N-dialkylamino)alkanols, such as the well-known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltn salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributytin hydroxide, trioctyltin hydroxide, dibutyltin oxide, dioctyltin oxide, dilauryltin oxide, dibutyltin-bis-(isopropoxide) dibutyltin-bis(2-dimethylaminopTnty-late), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

When the product to be formed is a polyurethane foam, a small amount of a blowing agent is employed in the reaction mixture. Suitable blowing agents, for example, include water from about 0.5 to about 5 weight percent, based upon total weight of the polymer/polyol composition, or other suitable blowing agents which are vaporized by the exotherm of the reaction, or a combination of water and the other blowing agent. Illustrative polyurethane blowing agents include halogenated hydrocarbons such as trichloromono-fluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally unstable compounds which liberate gases upon heating such as N,N'-dimethyl-N,N'-dinitrosoterephthalamide, amine formates, and the like. The generally preferred method of foaming for producing flexible foams is the use of water, or a combination of water plus a fluorocarbon blowing agent such as trichloromonofluoromethane. The quantity of blowing agent employed will vary with factors such as the density desired in the foamed product.

The scorch-free properties of the foams produced using polymer/polyol compositions are most evident when at least some of the blowing agent is water, and the water is used in an amount that results in a foam having a density less than 3.0 pounds per cubic foot. Generally, the use of water in an amount of about 2.0 percent by weight, based on the total weight of the polymer/polyol composition, results in a foam having a density of less than 3.0 pounds per cubic foot.

It is also within the scope of the invention to employ small amounts, e.g., about 0.001 percent to 5.0 percent by weight, based on the total reaction mixture, of a foam stabilizer. Suitable foam stabilizers or surfactants are known and may vary depending upon the particular polyurethane application. Suitable stabilizers for slabstock applications include "hydrolyzable" polysiloxane-polvoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,686,254 and British Pat. No. 1,220,471. The latter class of copolymers differs from the above-mentioned polysiloxane-polyoxyalkylene block copolymers in that the polysiloxane moiety is bonded to the polyoxy-alkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924.

The polyurethanes so produced may be utilized in foam and elastomer applications where any conventional type of polyurethane is or can be utilized. The polymer/polyol compositions of this invention find particular utility in the production of high resiliency foams for use in arm rests, mattresses, automobile seats, and the like, as well as in slabstock foams for use as carpet underlayment, and the like.

As has been described herein, and as will be seen from the Examples which follow, it is preferred in forming the polyurethane, to utilize a polymer/polyol prepared in a manner such that the degree of crosslinking in the polymer is minimized in order to provide desired combustion resistance and further such that the the polymer has a certain minimum intrinsic viscosity. Foams prepared from such polymer/polyols exhibit improved combustion resistance, as well as satisfactory tensile properties.

DEFINITIONS

As used in the Examples, the following designations, symbols, terms and abbreviations have the following meanings:

Polyol I denotes a product made by reacting propylene oxide, then ethylene oxide, then additional propylene oxide successively with glycerine in the presence of potassium hydroxide catalyst, and refining to remove the catalyst. The product contains 10 weight percent ethylene oxide and has a hydroxyl number of 52.

Polyol II denotes a product made by reacting propylene oxide, then ethylene oxide, then additionally propylene oxide, with glycerine in the presence of potassium hydroxide catalyst, and refining to remove the catalyst The product contains 14 weight percent ethylene oxide and has a hydroxyl number of 31.

Polyol III denotes a product made by reacting propylene oxide, then ethylene oxide, then additionally propylene oxide with glycerine in the presence of potassium hydroxide catalyst and refining to remove the catalyst. The product contains 10 weight percent ethylene oxide and has a hydroxyl number of 34.

Polyol IV denotes a product made by reacting propylene oxide and ethylene oxide successively with glycerine in the presence of potassium hydroxide catalyst, and refining to remove the catalyst. The product contains 16.5 weight percent ethylene oxide and has a hydroxyl number of 35.5.

Polyol V denotes a product similar to polyol III except that the hydroxyl number is 29.

Stabilizer A denotes a stabilizer precursor made by reacting a 34 hydroxyl number, 15 weight percent ethylene oxide capped polyoxyproxylene triol with maleic anhydride and subsequently with ethylene oxide. The stabilizer precursor has a hydroxyl number of 32, an unsaturation of 0.1 meq/gm, with the unsaturation being 30/70 maleate/fumarate, the retained unsaturation being 50 percent of the unsaturation added with the maleic anhydride.

Stabilizer B denotes a stabilizer precursor made by reacting a 28 hydroxyl number sorbitol started polyol, containing 10% internal ethylene oxide, with maleic anhydride and subsequently with propylene oxide. The precursor stabilizer has a hydroxyl number of 28 and an unsaturation of approximately 0.07 meq/g, with the unsaturation being of the fumarate type, the retained unsaturation being 70 percent of the unsaturation added with the maleic anhydride.

Catalyst A-1 denotes a solution consisting of 70% bis (2-dimethylaminoethyl) ether and 30% dipropylene glycol Catalyst 33 denotes a solution consisting of 33% triethylenediamine and 67% dipropylene glycol Monomer A denotes acrylonitrile Monomer S denotes styrene Monomer MMA denotes methyl methacrylate AIBN denotes 2,2'-azobis(isobutyronitrile); this catalyst is used in each of the Examples unless otherwise noted.

PCA denotes Polymer Control Agent

B denotes benzene

BUTOH denotes n-butanol

CH denotes cyclohexane

EB denotes ethylbenzene

ISOP denotes isopropanol

MEOH denotes methanol

Silicone surfactant A denotes Union Carbide L-5750 polysiloxane polyether block copolymer.

Silicone surfactant B denotes Union Carbide Y-10184 polysiloxane polyether block copolymer.

In the examples, the residence time set forth is always that of the first stage and the residence time of the second stage is always the same as that of the first. Conversion is always calculated on the basis of the final reactor stage.

Polymer/Polyol Preparation

The polymer/polyol compositions of the Examples were prepared continuously in a tank reactor fitted with baffles and an impeller. The feed components were pumped into the reactor continuously after going through an in-line mixer to assure complete mixing of the feed components before entering the reactor. The internal temperature of the reactor was controlled to within one degree Centigrade. The contents of the reactor were well mixed. The product flowed out of the top of the reactor continuously through a back pressure regulator that had been adjusted to give some positive back-pressure in the reactor. Portions of the crude product were vacuum stripped at about 2 millimeters absolute pressure and 120° C. to 130° C. for testing. Percent by weight polymer in the polymer/polyol was determined from analysis of the amount of unreacted monomers present in the crude product before stripping. In Examples 3 through 5, 16 through 18, 22, and 23, the product from the top of the reactor was further reacted in a second stage to increase the conversion of monomer to polymer. All of the polymer/polyols in the Examples were stable compositions.

POLYMER/POLYOL PROPERTIES

Filtration Hindrance (Filterability)

This is determined by diluting one part by weight sample (e.g., 200 grams) of polymer/polyol with two parts by weight anhydrous isopropanol (e.g., 400 grams) to remove any viscosity-imposed limitations and using a fixed quantity of material in relation to a fixed cross-sectional area of screen (e.g., 1⅛ in. diameter), such that all of the polymer/polyol and isopropanol solution passes by gravity through a 150-mesh screen. The 150-mesh screen has a square mesh with average mesh opening of 105 microns, and it is a "Standard Tyler" 150 square-mesh screen. The amount of sample which passes through the screen is reported in percent, a value of 100 percent being preferred. Trace solids will generally always be present, but a value of 100 percent indicates that over 99 weight percent passes through the screen.

Centrifugable Solids

After stripping unreacted monomer, the polymer/polyol composition is centrifuged for about 24 hours at about 3000 revolutions per minute and 1470 radial centrifugal "g" force. The centrifuge tube is then inverted and allowed to drain for 4 hours. The nonflowing cake remaining at the bottom of the tube is reported as weight percentage of the initial weight of the composition tested.

Crosslinking Coefficient (XLC)

This test consists of determining the light transmission through a dispersion (or solution) of polymer/polyol in dimethylformamide (DMF) such that one percent of the polymer is present in the dispersion (some polyol is also present; experimental analysis has indicated that the influence of any polyol added to DMF is insignificant within the bounds of normal statistical error . This dispersion is transferred to one of two matched 1 cm transmission cells while the second matched cell is filled wlth DMF. A Bausch & Lomb Spectronic 710 spectrophotometer is calibrated to 100 percent transmission for the transmission of light at 500 millimicrons wave length through the second DMF-filled cell. After this caiibration, the percent light transmission through the first polymer/DMF-filled cell is measured and referred to as LT for light transmission.

A cross-linking coefficient (XLC) is then determined by subtracting the light transmission from 100 according to the formula:

$$XLC = 100 - LT.$$

Intrinsic Viscosity

To determine the intrinsic viscosity of the polymer in polymer/polyols, the polymer must first be separated from the polyol and then the intrinsic viscosity is determined for the separated polymer after drying.

Polymer Separation

The polymer is separated from the polyol by diluting a portion of the polymer/polyol (e.g. about 25 grams) with a mixture of (e.g.—about 200 grams) of hexane/ethyl acetate of about 80/20 weight ratio. This polymer/polyol and solvent blend is thoroughly mixed and then centrifuged for 30 minutes at about 14,000 rpm at 20° C. After centrifugation, the upper layer containing solvent and most of the polyol is decanted off and discarded. An additional amount (e.g.—about 80 gms) of mixed hexane/ethyl acetate solvent is added to the wet cake in the bottom of the centrifuge tube and mixed by stirring, followed by re-centrifugation for 15 minutes.

The dilution, mixing, and centrifugation is repeated a third time to assure that all the free polyol is removed. The wet centrifuge cake is then vacuum dried at 50° C.

Intrinsic Viscosity Measurement

The intrinsic viscosity is determined from dilute solution viscosity measurements using a capillary viscometer such as a Ubbelohde type. Solution viscosities at four or five different concentrations in the range of 0 to 1 gram of polymer per deciliter of dimethylformamide (DMF) solution are determined at 30° C. The viscosity of the DMF solvent is also measured at 30° C. From these measurements, the reduced viscosity is calculated by the following formula:

$$\text{Reduced Viscosity} = \frac{\left(\frac{\text{Viscosity of Polymer Solution}}{\text{Viscosity of DMF}} - 1\right)}{\text{Polymer Concentration as grams/100 ml}}$$

The intrinsic viscosity is obtained by extrapolating the reduced viscosity to zero concentration so that the intrinsic viscosity is independent of concentration. The intrinsic viscosity, like the reduced viscosity, has units of deciliters per gram. The accuracy of the value determined is considered to be +/−0.01.

For a more detailed description on intrinsic viscosity see P. J. Flory, *Principles of Polymer Chemistry*, Cornell University Press, 1953.

Unsaturation of the Stabilizer Precursor

The level of maleate and/or fumarate unsaturation of the stabilizer precursor prepared from the reaction of maleic anhydride with a polyol and an alkylene oxide is determined as follows.

Sample containing one to three milliequivalents of unsaturation is placed in a Pyrex glass pressure bottle. The maximum sample size is 17 g. To it is added 10 ml of 1.0 N solution of morpholine in n-propyl alcohol. The bottle is sealed, placed in a protective container and heated at 98° C. (steam bath) for two hours. The bottle is cooled, opened and 15 ml of methanol are added. The contents are transferred to a beaker with the aid of an additional 10 ml of methanol. The beaker contents are titrated with 0.5 N perchloric acid in 2-methoxyethanol using a potentiometric titrator such as the Mettler Memotitrator model DL-40RC with a non-aqueous electrode. Two end points are observed. The first corresponds to the excess of morpholine in the system, the second to the tertiary amine formed by reaction of morpholine with the conjugated double bond. The difference in amount of titrant corresponding to the two end points is equivalent to the amount of maleate and/or fumarate unsaturation in the stabilizer precursor.

This method, using a 10 gram sample and based on the parameters set forth above, appears to have a lowest detectable limit of maleate and/or fumarate unsaturation of about 0.025 meq/9.

Maleate/Fumarate Ratio

The maleate/fumarate ratio of the stabilizer precursor was determined by proton nuclear magnetic resonance spectroscopy. The maleate band is observed at about 6.3 ppm and the fumarate band is observed at about 6.8 to about 6.85 ppm using deuterochloroform solvent.

FREE-RISE FOAM PREPARATION

Free-rise foams were prepared from the polymer/polyols identified in the Examples by the following procedure using the proportion of components shown in Table A. The polymer/polyol, water, amine catalyst, and silicone surfactant were charged to a ½ gallon paper container equipped with a baffle assembly, and mixed at 2400 rpm for 60 seconds with a 2.4-inch diameter, 4-blade turbine stirrer placed one inch above the bottom of the container. The mixture was allowed to set for 15 seconds to degas. Tin catalyst was added after degassing and mixed at 2400 rpm for 10 seconds. With the mixer still running, tolylene diisocyanate was added, and the components were mixed for 5 seconds. The mixture was poured before it started to cream into a 14 in.×14 in.×6-in. cardboard cake box. The foam mixture was allowed to react and subsequently to rise freely in the box until the reaction was complete. The foam was then placed in a conventional oven preheated to 250° F. for 5 minutes. Foam density and properties were determined pursuant to ASTM Standard D3574-77.

TABLE A

| FREE-RISE FOAM FORMULATION | |
| --- | --- |
| Components | Parts |
| Polymer/polyol of examples | 100 |
| Water | 2.3 |
| Catalyst A-1 | 0.05 |
| Stannous octoate | 0.09–0.12 |
| Silicone Surfactant A | 0.9 |
| 80/20 2.4/2.6 Tolylene Diisocyanate (110 index) | |

MOLDED FOAM PREPARATION

Molded foams were prepared from the polymer/polyols of the Examples 22 and 23 by the following procedure using the proportions of components shown in Tables B and C respectively. The polyol and polymer/polyol, water, catalysts, and surfactant were mixed in a one-half gallon paper carton fitted with a 4000 rpm mixer and baffles for 55 seconds. The isocyanate was then added rapidly, and mixing was resumed for an additional 5 seconds. The mixture was quickly poured into a waxed aluminum mold which had been preheated to 50° to 60° C. The mold was then quickly closed and clamped. After two minutes, the mold was placed in an oven at 121° C. for 5 to 8 minutes. The foam was then removed from the mold and crushed between nip rollers in order to prevent shrinkage. The crushed foam was post-cured 30 minutes at 120° C. After curing the foam, specimens were cut and tested pursuant to ASTM Standard 03574-77 and FMVSS-302. With regard to the latter standard, the total burn length reported was measured as the distance from the foam edge nearest the flame to the point of extinguishment.

TABLE B

| MOLDED FOAM FORMULATION | |
| --- | --- |
| Components | Parts |
| Polyol IV | 68.5 |
| Polymer/polyol of Examples | 31.5 |
| Water | 2.8 |
| Diethylanolamine | 2.0 |
| Catalyst A-1 | 0.08 |
| Catalyst 33 | 0.29 |
| Dibutyltin dilaurylmercaptide | 0.01 |
| Silicone Surfactant B | 2.0 |
| 80/20 2.4/2.6 Tolylene Diisocyanate (103 Index) | |

TABLE C

| MOLDED FOAM FORMULATION | |
| --- | --- |
| Components | Parts |
| Polyol V | 62 |
| Polymer/polyol of Examples | 38 |
| Water | 4.5 |
| Diethanolamine | 1.7 |
| Catalyst 33 | 0.5 |
| Dibutyltin dilaurylmercaptide | 0.0065 |
| Silicone Surfactant B | 3.5 |
| 80/20 2.4/2.6 Tolylene diisocyanate (96 Index) | |

The following Examples are illustrative of, and not in limitation of, the present invention. Unless otherwise indicated, all percentages set forth are weight percents. Viscosities are reported in centistokes.

EXAMPLES 1 AND 2

These Examples illustrate the effect on intrinsic viscosity of various concentrations of polymer control agent. In each Example, the polymer control agent employed was isopropanol, typically classed as a moderate chain transfer agent. The reaction conditions and properties of the resulting polymer/polyol are set forth in Table I:

TABLE I

| Example No. | 1 | 2(C)[1] |
| --- | --- | --- |
| Reaction Temp., °C. | 125 | 125 |
| Wt. % Catalyst in Feed | 0.6 | 0.6 |
| Polymer Control Agent | ISOP | ISOP |
| Wt. % PCA in Feed | 3 | 10 |
| Wt. % Monomers in Feed | 42.7 | 40.8 |
| Monomer Type | A/S | A/S |
| Ratio of Monomers | 40/60 | 40/60 |
| Polyol Type | I | I |
| Stabilizer Type | A | A |
| % Stabilizer in Polyol Mix | 6 | 6 |
| Residence Time, minutes | 12 | 12 |
| No. of Reactor Stages | 1 | 1 |
| Monomer Conversions % | 93.4 | 88.8 |
| XLC | 1.2 | 1.1 |
| Intrinsic Viscosity | 0.62 | 0.33 |
| Viscosity | 5044 | 3876 |
| % Polymer | 41.7 | 41.7 |
| Filterability 150 mesh | 100 | 100 |
| Centrifugable Solids | 6.0 | 8.2 |

[1](C) denotes that this is a control. Controls are similarly identified in the following Examples.

Free-rise foams were prepared according to the procedure set forth above using the polymer/polyols of these Examples. The foams were prepared at the same time so as to minimize the effect of varying day-to-day ambient conditions, particularly humidity, in the results. The foam tensile properties are set forth in Table II:

TABLE II

| Polymer/Polyol Of Ex. No. | 1 | 2(C) |
| --- | --- | --- |
| Foam Tensile Properties | | |
| Tensile Strength, psi | 31.6 | 22.7 |
| Elongation, % | 86 | 62 |
| Tear, pli | 3.3 | 1.5 |

As can be seen from the data in Tables I and II, the higher level of polymer control agent used in the preparation of the polymer/polyol resulted in the polymer of Example 2 having a lower intrinsic viscosity than that of the polymer of Example 1. Likewise, the resulting foam properties of the foam prepared using the polymer/polyol of Example 2 were inferior to those of the foam prepared using the polymer/polyol of Example 1.

EXAMPLES 3–5

These Examples illustrate the effect on intrinsic viscosity of varying the reaction parameters, particularly catalyst concentration, reaction temperature, and amount of polymer control agent used. Higher temperatures and higher catalyst concentration (Example 5) and higher polymer control agent concentration (Example 4) tend to lower the intrinsic viscosity of the polymer. The reaction parameters and properties of the polymer/polyols are set forth in Table III:

TABLE III

| Example No. | 3 | 4(C) | 5(C) |
|---|---|---|---|
| Reaction Temp., °C. | 110 | 110 | 130 |
| Wt. % Catalyst in Feed | 0.4 | 0.4 | 0.8 |
| Polymer Control Agent | ISOP | ISOP | ISOP |
| Wt. % PCA in Feed | 5 | 10 | 5 |
| Wt. % Monomers in Feed | 42.5 | 42.5 | 42.5 |
| Monomer Type | A/S | A/S | A/S |
| Ratio of Monomers | 30/70 | 30/70 | 30/70 |
| Polyol Type | I | I | I |
| Stabilizer Type | A | A | A |
| % Stabilizer in Polyol Mix | 6 | 6 | 6 |
| Residence Time, minutes | 20 | 20 | 20 |
| No. of Reactor Stages | 2 | 2 | 2 |
| Monomer Conversions % | 96.8 | 92.8 | 93.4 |
| XLC | 0.70 | 0 | 0.1 |
| Intrinsic Viscosity | 0.75 | 0.51 | 0.42 |
| Viscosity | 5067 | 4560 | 4314 |
| % Polymer | 44.0 | 45.8 | 43.5 |
| Filterability 150 mesh | 100 | 25 | 17 |
| Centrifugable Solids | 7.0 | 6.1 | 6.0 |

The tensile properties of the foams prepared from each of the polymer/polyols of these Examples is set forth in Table IV. The foams were each prepared at the same time.

TABLE IV

| Polymer/Polyol Of Ex. No. | 3 | 4(C) | 5(C) |
|---|---|---|---|
| Foam Tensile Properties | | | |
| Tensile Strength, psi | 30.2 | 26.8 | 21.3 |
| Elongation, % | 87 | 75 | 61 |
| Tear, pli | 3.1 | 2.4 | 1.6 |

The foam prepared from the polymer/polyol whose polymer had the highest intrinsic viscosity (Example 3) exhibited the best tear and tensile strength and elongation properties.

EXAMPLES 6 AND 7

These examples illustrate the effect on intrinsic viscosity of using, as polymer control agents, materials having varying chain transfer activity. In Example 6, isopropanol was used; while, in Example 7, methanol, generally considered as having at most minimal chain transfer activity, is employed. The reaction parameters employed and properties of the resulting polymer/polyols are set forth in Table V:

TABLE V

| Example No. | 6(C) | 7 |
|---|---|---|
| Reaction Temp., °C. | 125 | 125 |
| Wt. % Catalyst in Feed | 0.6 | 0.6 |
| Polymer Control Agent | ISOP | MEOH |
| Wt. % PCA in Feed | 4.6 | 4.6 |
| Wt. % Monomers in Feed | 42.1 | 41.8 |
| Monomer Type | A/S | A/S |
| Ratio of Monomers | 30/70 | 30/70 |
| Polyol Type | I/II[1] | I/II[1] |
| Stabilizer Type | A | A |
| % Stabilizer in Polyol Mix | 6 | 6 |
| Residence Time, minutes | 12 | 12 |
| No. of Reactor Stages | 1 | 1 |
| Monomer Conversions % | 89.5 | 89.8 |
| XLC | 1.6 | 1.8 |
| Intrinsic Viscosity | 0.50 | 0.66 |
| Viscosity | 4170 | 4328 |
| % Polymer | 40.8 | 40.6 |
| Filterability 150 mesh | 100 | 100 |
| Centrifugable Solids | 4.7 | 4.9 |

[1]Polyols I and II in a weight ratio of 79/21, respectively.

It can be seen from the data that, at the same concentration of polymer control agent, use of a polymer control agent having a lower chain transfer activity will provide a polymer having an intrinsic viscosity which is higher than the intrinsic viscosity of a polymer using a polymer control agent having higher chain transfer activity. Accordingly, by the appropriate selection of the polymer control agent, the intrinsic viscosity of the polymer may be controlled.

Free-rise foams were prepared at the same time from each of the polymer/polyols of Examples 6 and 7. The tensile properties of the foams are set forth in Table VI:

TABLE VI

| Polymer/Polyol of Ex. No. | 6(C) | 7 |
|---|---|---|
| Foam Tensile Properties | | |
| Tensile Strength, psi | 27.3 | 32.0 |
| Elongation, % | 81 | 97 |
| Tear, pli | 2.5 | 3.3 |

The effect of polymer intrinsic viscosity is illustrated by the data. The foam prepared using the polymer/polyol of Example 7 had improved properties as compared to the foam prepared using the polymer/polyol of Example 6.

EXAMPLES 8-10

These Examples illustrate the effect on intrinsic viscosity of different polymer control agents, including water, which is not normally considered to have any observable chain transfer activity in the classical sense. The reaction parameters and polymer/polyol properties are set forth in Table VII:

TABLE VII

| Example No. | 8 | 9 | 10 |
|---|---|---|---|
| Reaction Temp., °C. | 125 | 125 | 125 |
| Wt. % Catalyst in Feed | 0.6 | 0.6 | 0.6 |
| Polymer Control Agent | WATER | MEOH | ISOP |
| Wt. % PCA in Feed | 4.6 | 4.6 | 4.6 |
| Wt. % Monomers in Feed | 41.7 | 42.3 | 41.9 |
| Monomer Type | A/S | A/S | A/S |
| Ratio of Monomers | 30/70 | 30/70 | 30/70 |
| Polyol Type | I | I | I |
| Stabilizer Type | A | A | A |
| % Stabilizer in Polyol Mix | 10 | 10 | 10 |
| Residence Time, minutes | 12 | 12 | 12 |
| No. of Reactor Stages | 1 | 1 | 1 |
| Monomer Conversions % | 91.5 | 92.5 | 89.8 |
| XLC | 1.5 | 1.1 | 1.0 |
| Intrinsic Viscosity | 1.02 | 0.74 | 0.59 |
| Viscosity | 5675 | 4873 | 4938 |
| % Polymer | 41.0 | 41.8 | 40.7 |
| Filterability 150 mesh | 100 | 100 | 100 |
| Centrifugable Solids | 6.8 | 5.6 | 6.0 |

It can be seen from the data that, at the same weight percent of polymer control agnet in the feed, the lower the chain transfer activity of the polymer control agent, the higher the intrinsic viscosity of the polymer. Further, and quite unexpectedly, it can be seen that water can be used to achieve the desired crosslinking coefficient of the polymer/polyol composition and likewise provides a suitable means by which to control the intrinsic viscosity of the polymer.

Further, the foam properties of foams prepared using polymer/polyols made by using either methanol or water have been found to be superior. The foam properties are set forth in Table VIII:

TABLE VIII

| Polymer/Polyol Of Ex. No. | 8 | 9 | 10 |
|---|---|---|---|
| Foam Tensile Properties | | | |
| Tensile Strength, psi | 28.1 | 30.0 | 26.8 |
| Elongation, % | 83 | 94 | 79 |
| Tear, pli | 2.6 | 2.6 | 2.3 |

Thus, regardless of the specific mechanism involved, use of any low molecular weight liquid as a polymer control agent may be employed so long as the polymer control agent is capable of providing a polymer/polyol characterized by a polymer having the desired intrinsic viscosity and crosslinking coefficient. A polymer/polyol so characterized will provide foams having satisfactory tensile properties.

EXAMPLES 11–13

These Examples illustrate the effect on intrinsic viscosity of different polymer control agents and different concentrations of such polymer control agents. The reaction parameters and properties of the polymer/polyols are set forth in Table IX:

TABLE IX

| Example No. | 11 | 12 | 13 |
|---|---|---|---|
| Reaction Temp., °C. | 125 | 125 | 120 |
| Wt. % Catalyst in Feed | 0.6 | 0.6 | 0.6 |
| Polymer Control Agent | EB | CH | ISOP |
| Wt. % PCA in Feed | 4.6 | 4.6 | 1.0 |
| Wt. % Monomers in Feed | 41.7 | 42.3 | 44.3 |
| Monomer Type | A/S | A/S | A/S |
| Ratio of Monomers | 30/70 | 30/70 | 30/70 |
| Polyol Type | I | I | I |
| Stabilizer Type | A | A | A |
| % Stabilizer in Polyol Mix | 10 | 10 | 6 |
| Residence Time, minutes | 12 | 12 | 20 |
| No. of Reactor Stages | 1 | 1 | 1 |
| Monomer Conversions % | 90.2 | 91.2 | 92.9 |
| XLC | 1.0 | 11.4 | 5.4 |
| Intrinsic Viscosity | 0.74 | 1.01 | 0.95 |
| Viscosity | 4547 | 5120 | 6030 |

TABLE IX-continued

| Example No. | 11 | 12 | 13 |
|---|---|---|---|
| % Polymer | 40.6 | 41.4 | 42.3 |
| Filterability 150 mesh | 100 | 100 | 100 |
| Centrifugable Solids | 6.2 | 5.0 | 8.3 |

It can be seen that use of a lower concentration of a polymer control agent of high chain transfer activity (isopropanol in Example 13) provided a polymer with a high intrinsic viscosity. Comparatively, a higher concentration of polymer control agent which does not exhibit as high a chain transfer activity as isopropanol likewise provided a high intrinsic viscosity polymer.

Free-rise foams were prepared from each of the polymer/polyols of Examples 11–13. The foams of Examples 11 and 12 were prepared at the same time. The foam data is set forth in Table X:

TABLE X

| Polymer/Polyol Of Ex. No. | 11 | 12 | 13 |
|---|---|---|---|
| Foam Tensile Properties | | | |
| Tensile Strength, psi | 30.7 | 32.0 | 31.0 |
| Elongation, % | 85 | 87 | 101 |
| Tear, pli | 2.9 | 3.1 | 2.4 |

EXAMPLES 14–23

These Examples illustrate the preparation of various polymer/polyols utilizing a wide variety of reaction parameters. In each case, the polymer of the polymer/polyol composition has an intrinsic viscosity of at least 0.55.

Example 14 illustrates the properties of a polymer/polyol, the polymer portion of which is a terpolymer of acrylonitrile, styrene and methyl methacrylate. In Examples 15, 16 and 23, different concentrations of methanol were used, different stabilizer precursors were used, different polyols were used and different catalyst concentrations and temperatures were used. In Examples 17 and 18, benzene, which, like water, is not conventionally viewed as having chain transfer activity, was successfully used. Examples 19 and 20 illustrate the use of ethanol and butanol, respectively; and Example 21 illustrates the use of a mixture of isopropanol and methanol. The reaction parameters and properties of the resulting polymer/polyols are set forth in Table XI:

TABLE XI

| Example No. | 14 | 15 | 16 | 17 | 18 | 19 | 20 | 21 | 22 | 23 |
|---|---|---|---|---|---|---|---|---|---|---|
| Reaction Temp., °C. | 125 | 125 | 120 | 120 | 120 | 125 | 125 | 125 | 125 | 126 |
| Wt. % Catalyst in Feed | 0.6 | 0.6 | 0.55 | 0.6 | 0.6 | 0.6 | 0.6 | 0.6 | 0.65 | 0.7 |
| Polymer Control Agent | MEOH | MEOH | MEOH | BENZ | BENZ | ETOH | BUTOH | ISOP/MEOH | ISOP | MEOH |
| Wt. % PCA in Feed | 5 | 4.6 | 7 | 5 | 10 | 5 | 5 | 1/3 | 3 | 3 |
| Wt. % Monomers in Feed | 42.1 | 43.2 | 43.5 | 41.4 | 39.8 | 43.2 | 42.3 | 46.5 | 35.5 | 29.8 |
| Monomer Type | A/S/MMA | A/S | A/S | A/S | A/S | A/S | A/S | A/S | A/S | A/S |
| Ratio of Monomers | 30/60/10 | 30/70 | 30/70 | 30/70 | 30/70 | 30/70 | 30/70 | 30/70 | 30/70 | 30/70 |
| Polyol Type | I | I/III[1] | I | I | I | I | I | I | IV | V |
| Stabilizer Type | A | B | B | B | B | A | A | B | A | A |
| % Stabilizer in Polyol Mix | 6 | 8 | 10 | 10 | 10 | 10 | 10 | 10 | 8 | 9 |
| Residence Time, minutes | 12 | 12 | 45 | 20 | 20 | 12 | 12 | 20 | 21 | 21 |
| No. of Reactor Stages | 1 | 1 | 2 | 2 | 2 | 1 | 1 | 1 | 2 | 2 |
| Monomer Conversions % | 89.9 | 88.9 | 92.7 | 95.5 | 96.0 | 90.6 | 91.1 | 91.9 | 95.4 | 94.5 |
| XLC | 1.1 | 1.5 | 0.4 | 0.2 | 0 | 1.0 | 1.7 | 0.7 | 2.9 | 2.0 |
| Intrinsic Viscosity | 0.55 | 0.73 | 0.70 | 1.09 | 0.65 | 0.60 | 0.74 | 0.76 | 0.60 | 0.71 |
| Viscosity | 3746 | 4119 | 4227 | 4542 | 3699 | 5647 | 5341 | 4740 | 5500 | 5170 |
| % Polymer | 41.1 | 42.0 | 44.9 | 42.4 | 43.2 | 42.4 | 41.7 | 45.7 | 35.5 | 29.5 |
| Filterability 150 mesh | 100 | 100 | 100 | 100 | 100 | 100 | 100 | 100 | 100 | 100 |

TABLE XI-continued

| Example No. | 14 | 15 | 16 | 17 | 18 | 19 | 20 | 21 | 22 | 23 |
|---|---|---|---|---|---|---|---|---|---|---|
| Centrifugable Solids | 8.2 | 6.5 | 6.5 | 13.5 | 10.8 | 6.7 | 5.9 | 4.5 | 3.6 | 2.7 |

[1]Polyols I/III in a weight ratio of 70/30 respectively.

Free-rise foams were made from most of the polymer/polyols of these Examples. The foam properties are set forth in Table XII. For comparative purposes, the foams using the polymer/polyols of Examples 17 and 18 were prepared together, the foams using the polymer/polyol of Examples 19 and 20 were made together; and the foam using the polymer/polyol of Example 14 was made at the same time as the foam using the polymer/polyol of Example 1. All of the foams were considered to have satisfactory tensile properties.

TABLE XII

| Polymer/polyol of Ex. No. | 14 | 15 | 16 | 17 | 18 | 19 | 20 | 21 | 22 | 23 |
|---|---|---|---|---|---|---|---|---|---|---|
| Foam Tensile Properties | | | | | | | | | | |
| Tensile strength, psi | 25.9 | 30.9 | 31.6 | 31.9 | 30.9 | 24.0 | 30.1 | 28.1 | 18.3 | 18.9 |
| Elongation, % | 77 | 99 | 105 | 79 | 81 | 81 | 99 | 83 | 121 | 109 |
| Tear, pli | 3.1 | 2.9 | 3.4 | 2.1 | 2.0 | 3.3 | 3.4 | 3.3 | 0.9 | 1.4 |
| Total Foam Burn Length, in. | — | — | — | — | — | — | — | — | 1.0 | 3.2 |

EXAMPLES 24 AND 25

These Examples illustrate the preparation of high styrene content, acrylonitrile/styrene ratio polymer/polyols, utilizing different polymer control agents. The reaction conditions and properties of the resulting polymer/polyols are set forth in Table XIII:

TABLE XIII

| Example No. | 24 | 25 |
|---|---|---|
| Reaction Temp., °C. | 120 | 120 |
| Wt. % Catalyst in Feed | 0.6 | 0.6 |
| Polymer Control Agent | MEOH | ISOP |
| Wt. % PCA in Feed | 2 | 2 |
| Wt. % Monomers in Feed | 24.7 | 25.0 |
| Monomer Type | A/S | A/S |
| Ratio of Monomers | 20/80 | 20/80 |
| Polyol Type | I | I |
| Stabilizer Type | A | A |
| % Stabilizer in Polyol Mix | 10 | 10 |
| Residence Time, minutes | 12 | 12 |
| No. of Reactor Stages | 1 | 1 |
| Monomer Conversions % | 79.4 | 80.3 |
| XLC | 1.5 | 1.2 |
| Intrinsic Viscosity | 0.45 | 0.45 |
| Viscosity | 6841 | 5877 |
| % Polymer | 24.7 | 25.0 |
| Filterability 150 mesh | 100 | 100 |
| Centrifugable Solids | 8.4 | 6.1 |

Free-rise foams were made at the same time (and at the same time as the foams that were made in Examples 1 and 2) according to the procedure set forth above using the polymer/polyols of these Examples. The foam tensile properties are set forth in Table XIV:

TABLE XIV

| Polymer/Polyol of Ex. No. | 24 | 25 |
|---|---|---|
| Foam Tensile Properties | | |
| Tensile Strength, psi | 22.1 | 22.0 |
| Elongation, % | 114 | 112 |
| Tear, pli | 2.6 | 2.8 |

These data illustrate that the use of higher styrene levels provides foams with adequate tensile properties although the polymer has a relatively low intrinsic viscosity.

EXAMPLES OF VISCOSITY CONTROL

The viscosity control which can be achieved using the polymer control agents and post heat-treatment methodology in accordance with the invention are illustrated by the following.

The use of a polymer control agent to achieve viscosity control is illustrated by Examples 9 and 18. In those Examples, polymer/polyol compositions using methanol and benzene, respectively, were prepared at the indigenous composition viscosity utilizing the reaction conditions employed. A scanning electron micrograph of the isolated polymer confirmed that the particles were substantially smooth.

The use of a post-heat treatment process to achieve viscosity control is illustrated by three different techniques. The first is post-heat treatment of the polymer/polyol composition prior to stripping. The second is heat treatment of the stripped polymer/polyol product. The third is post-heat treatment of the polymer/polyol composition after stripping with the use of a solvating agent.

Using the first technique, two polymer/polyol compositions, respectively, of 45.5 and 45.4 weight percent polymer at an acrylonitrile-to-styrene ratio of 30/70 were made at essentially the same reaction conditions of residence time (20 minutes) and first stage reaction temperature of 110° C. The polymerization was carried out in the presence of 5 weight percent methanol, 0.4 weight percent AIBN and 10 weight percent Stabilizer B. Further reaction was carried out in a second stage reactor for 20 minutes, without stripping the polymer/polyol composition. The second stage reaction temperature of the first polymer/polyol was 108° C. and that of the second was 180° C. The respective final product viscosity of each polymer/polyol after the samples were vacuum stripped was 5256 cks and 4687 cks at 25° C.

The efficiency of the second technique is illustrated with the composition of Example 17. As prepared, that composition had a viscosity of 4542 cks at 25° C. Stripped product was heated for one hour at about 180° C. under a nitrogen atmosphere. After cooling, the viscosity was 3894 cks at 25° C.

As a further example, a polymer/polyol composition made under the conditions of Example 3 had a viscosity of 5255 cks at 25° C. Many of the polymer particles were observed under magnification to have rough exteriors. After stripping, the composition was heated for one hour at 180° C. The viscosity decreased to 4145 cks at 25° C. At this point, observation under magnification indicated that the vast majority of the particles had relatively smooth exteriors.

Using the third technique, the polymer/polyol composition of Example 8 was heated under reflux with 10 weight percent ethylbenzene for 90 minutes at 125° C. The viscosity decreased from 5675 cks at 25° C. to 4971 cks at 25° C.

We claim:

1. A normally liquid, stable polymer/polyol composition formed by polymerizing in the presence of a free radical catalyst and in the essential absence of an alkyl mercaptan chain transfer agent, (1) from at least about 35 to about 60 weight percent of a mixture of acrylonitrile and an ethylenically unsaturated comonomer or comonomers, at least one of said comonomers being styrene, in a weight ratio of acrylonitrile to comonomer, of from about 35:65 to 25:75, dissolved or dispersed in (2) from about 40 to about 75 weight percent of a component comprising a base polyol having a hydroxyl number of less than about 150, the polymer of said polymer/polyol being characterized by a crosslinking coefficient of less than 20 and an intrinsic viscosity of at least 0.80.

2. The polymer/polyol composition of claim 1 wherein said comonomer is styrene.

3. The polymer/polyol composition of claim 2 wherein the acrylonitrile and styrene mixture is present in an amount of at least about 40 percent by weight.

4. The polymer/polyol composition of claim 2 wherein the polymer is present in the form of particles, the majority having a smooth appearance.

5. The polymer/polyol composition of claim 2 wherein the acrylonitrile to styrene weight ratio is about 35:65 to about 30:70.

6. The polymer/polyol composition of claim 2 wherein the crosslinking coefficient is less than about 10.

7. The polymer/polyol composition of claim 6 wherein the crosslinking coefficient is less than about 5.

8. The polymer/polyol composition of claim 7 wherein the crosslinking coefficient is essentially zero.

9. The polymer/polyol composition of claim 2 wherein said base polyol is a poly (oxypropylene) polyol.

10. The polymer/polyol composition of claim 9 wherein component (2) comprises a polyol mixture of the base polyol and a stabilizer precursor present in an amount sufficient to assist the dispersion stability of the resulting polymer/polyol.

11. The polymer/polyol composition of claim 10 wherein said stabilizer precursor has retained unsaturation of at least about 0.03 milliequivalents per gram.

12. The polymer/polyol composition of claim 10 wherein said stabilizer precursor has retained unsaturation, said unsaturation being predominantly fumarate.

13. A normally liquid, stable polymer/polyol composition formed by polymerizing in the presence of a free radical catalyst and in the essential absence of an alkyl mercaptan chain transfer agent, (1) from about 25 to about 60 weight percent of a mixture of acrylonitrile and an ethylenically unsaturated comonomer or comonomers in a weight ratio, respectively, of from about 45:55 to 25:75, dissolved or dispersed in (2) from about 40 to about 75 weight percent of a polyol mixture comprising (a) a base polyol having a hydroxyl number of less than about 150 and (b) a stabilizer precursor having retained unsaturation of at least about 0.05 milliequivalent per gram which is at least 50 percent of the added unsaturation and said stabilizer precursor is present in an amount sufficient to assist the dispersion stability of the resulting polymer/polyol, the polymer of said polymer/polyol being characterized by a crosslinking coefficient of less than about 10 and an intrinsic viscosity of greater than 0.62.

14. The polymer/polyol composition of claim 13 wherein said comonomer is styrene.

15. The polymer/polyol composition of claim 14 wherein the acrylonitrile and styrene mixture is present in an amount of at least about 30 percent by weight.

16. The polymer/polyol composition of claim 15 wherein the acrylonitrile and styrene mixture is present in an amount of at least about 40 percent by weight.

17. The polymer/polyol composition of claim 14 wherein the polymer is present in the form of particles, the majority having a smooth appearance.

18. The polymer/polyol composition of claim 14 wherein the acrylonitrile to styrene weight ratio is about 45:55 to about 30:70.

19. The polymer/polyol composition of claim 14 wherein the crosslinking coefficient is less than about 5.

20. The polymer/polyol composition of claim 14 wherein the crosslinking coefficient is essentially zero.

21. The polymer/polyol composition of claim 14 wherein the base polyol is a poly (oxypropylene) polyol.

22. The polymer/polyol composition of claim 14 wherein the retained unsaturation of the stabilizer precursor is fumarate.

23. The polymer/polyol composition of claim 14 wherein the stabilizer precursor is formed from a poly (oxypropylene) polyol prepared at least in predominant part with a starter having a functionality in excess of 3.

24. The polymer/polyol composition of claim 23 wherein said starter is sorbitol.

25. The polymer/polyol composition of claim 14 wherein said stabilizer precursor has a predominance of secondary hydroxyl groups.

26. The polymer/polyol composition of claim 14 wherein the intrinsic viscosity is at least about 0.65.

27. A normally liquid, stable polymer/polyol composition formed by polymerizing in the presence of a free radical catalyst and in the essential absence of an alkyl mercaptan chain transfer agent, (1) from about 25 to about 60 weight percent of a mixture of acrylonitrile and an ethylenically unsaturated comonomer or comonomers in a weight ratio, respectively, of from about 45:55 to about 25:75, dissolved or dispersed in (2) from about 40 to 75 weight percent of a polyol mixture comprising (a) a base polyol having a hydroxyl number of less than about 150 and (b) a stabilizer precursor present in an amount sufficient to assist the dispersion stability of the resulting polymer/polyol, the polymer of said polymer/polyol being characterized by a crosslinking coefficient of less than about 5 and an intrinsic viscosity of at least about 0.62.

28. The polymer/polyol composition of claim 27 wherein said comonomer is styrene.

29. The polymer/polyol composition of claim 28 wherein said base polyol is a poly (oxypropylene) polyol.

30. The polymer/polyol composition of claim 28 wherein the acrylonitrile and styrene mixture is present in an amount of at least about 30 percent by weight.

31. The polymer/polyol composition of claim 30 wherein the acrylonitrile and styrene mixture is present in an amount of at least about 40 percent by weight.

32. The polymer/polyol composition of claim 28 wherein the intrinsic viscosity is at least about 0.65.

33. The polymer/polyol composition of claim 28 wherein the acrylonitrile to styrene weight ratio is about 45:55 to about 30:70.

34. The polymer/polyol composition of claim 28 wherein the crosslinking coefficient is essentially zero.

35. A normally liquid, stable polymer/polyol composition formed by polymerizing in the presence of a free radical catalyst and in the essential absence of an alkyl mercaptan chain transfer agnet, (1) from about 30 to about 60 weight percent of a mixture of acrylonitrile and an ethylenically unsaturated comonomer or comonomers in a weight ratio of from about 45:55 to about 25:75, dissolved or dispersed in (2) from about 40 to about 70 weight percent of a polyol mixture comprising (a) a base polyol having a hydroxyl number of less than about 150 and (b) a stabilizer precursor present in an amount sufficient to assist the dispersion stability of the resulting polymer/polyol, the polymer of said polymer/polyol being characterized by a crosslinking coefficient of less than about 5 and an intrinsic viscosity of at least about 0.55.

36. The polymer/polyol composition of claim 35 wherein said comonomer is styrene.

37. The polymer/polyol composition of claim 37 wherein said base polyol is a poly (oxypropylene) polyol.

38. The polymer/polyol composition of claim 37 wherein the acrylonitrile and styrene mixture is present in an amount of at least about 40 percent by weight.

39. The polymer/polyol composition of claim 36 wherein the intrinsic viscosity is at least about 0.65.

40. The polymer/polyol composition of claim 36 wherein the acrylonitrile to styrene weight ratio is about 45:55 to about 30:70.

41. The polymer/polyol composition of claim 36 wherein the crosslinking coefficient is essentially zero.

42. The polymer/polyol composition of claim 36 wherein the stabilizer precursor has retained unsaturation of at least about 0.03 milliequivalents per gram.

43. The polymer/polyol composition of claim 36 wherein said stabilizer precursor has retained unsaturation, said unsaturation being fumarate.

44. The polymer/polyol composition of claim 36 wherein the stabilizer precursor is formed from a poly (oxypropylene) polyol prepared at least in predominant part with a starter having a functionality in excess of 3.

45. The polymer/polyol composition of claim 44 wherein said starter is sorbitol.

46. The polymer/polyol composition of claim 36 wherein said stabilizer precursor has a predominance of secondary hydroxyl groups.

47. A normally liquid, stable polymer/polyol composition formed by polymerizing in the presence of a free radical catalyst and in the essential absence of an alkyl mercaptan chain transfer agent, (1) from about 25 to about 60 weight percent of a monomer mixture of styrene and a comonomer or comonomers in a weight ratio of from about 75:25 to about 100:0, dissolved or dispersed in (2) from about 40 to about 75 weight percent of a polyol mixture comprising (a) a base polyol having a hydroxyl number of less than about 150 and (b) a stabilizer precursor present in an amount sufficient to assist the dispersion stability of the resulting polymer/polyol, the polymer of said polymer/polyol being characterized by a crosslinking coefficient of less than about 55 and an intrinsic viscosity of at least about 0.30.

48. The polymer/polyol composition of claim 47 wherein said comonomer is acrylonitrile.

49. The polymer/polyol composition of claim 48 wherein the intrinsic viscosity is at least about 0.40.

50. The polymer/polyol composition of claim 49 wherein the intrinsic viscosity is at least about 0.50.

51. The polymer/polyol composition of claim 48 wherein the crosslinking coefficient is less than about 20.

52. The polymer/polyol composition of claim 48 wherein the stabilizer precursor has retained unsaturation of at least about 0.03 milliequivalents per gram.

53. The polymer/polyol composition of claim 48 wherein the stabilizer precursor has retained unsaturation, said unsaturation being fumarate.

54. The polymer/polyol composition of claim 48 wherein the stabilizer precursor is formed from a poly (oxypropylene) polyol prepared at least in predominant part with a starter having a functionality in excess of 3.

55. The polymer/polyol composition of claim 54 wherein said starter is sorbitol.

56. The polymer/polyol composition of claim 48 wherein said stabilizer precursor has a predominance of secondary hydroxyl groups.

57. A process for producing a normally liquid, stable polymer/polyol capable of conversion to a polyurethane which comprises: (a) providing a base polyol having a hydroxyl number of less than about 150, (b) dissolving or dispersing from about 25 to about 60 weight percent of an ethylenically unsaturated monomer or monomers in from about 40 to about 75 weight percent of said base polyol, and (c) polymerizing in the presence of a free radical catalyst and a polymer control agent having at most minimal chain transfer activity, said polymer control agent being present in an amount sufficient to provide the polymer/polyol with a product viscosity which is lower than if said polymer/polyol was prepared in the absence of said polymer control agent while retaining an intrinsic viscosity of at least 0.30.

58. The process for producing the normally liquid, stable polymer/polyol composition of claim 57 wherein said polymer control agent is a member selected from the group consisting of methanol, water, benzene, cyclohexane and mixtures thereof.

59. The process of claim 57 wherein the polymer control agent is methanol.

60. The process of claim 57 wherein the polymer control agent is a mixture of methanol and water.

61. The process for producing the normally liquid, stable polymer/polyol composition of claim 57 wherein a monomer mixture is used and includes acrylonitrile and the polymer has a crosslinking coefficient of less than about 55.

62. The process for producing the normally liquid, stable polymer/polyol composition of claim 62 wherein the crosslinking coefficient is less than about 20.

63. The process for producing the normally liquid, stable polymer/polyol composition of claim 61 wherein the intrinsic viscosity is at least about 0.55.

64. The process for producing the normally liquid, stable polymer/polyol composition of claim 61 wherein the intrinsic viscosity is at least about 0.65.

65. The process for producing the normally liquid, stable polymer/polyol composition of claim 61 wherein the monomer mixture includes styrene.

66. The process for producing the normally liquid, stable polymer/polyol composition of claim 65 wnerein the acrylonitrile to styrene weight ratio is from about 45:55 to 25:75.

67. The process for producing the normally liquid, stable polymer/polyol composition of claim 65 wherein the acrylonitrile and styrene mixture is present in an amount of at least about 30 percent by weight.

68. The process for producing the normally liquid, stable polymer/polyol composition of claim 65 wherein the polymerization is carried out in the presence of a stabilizer precursor present in an amount sufficient to assist the dispersion stability of the resulting polymer/polyol.

69. The process for producing the normally liquid, stable polymer/polyol composition of claim 65 wherein the polymer control agent is present in an amount up to about 30 percent by weight of the composition.

70. A normally liquid, stable polymer/polyol composition, capable of conversion to a polyurethane, formed by polymerizing in the presence of a free radical catalyst and a polymer control agent having at most minimal chain transfer activity, (1) from about 25 to about 60 weight percent of an ethylenically unsaturated monomer or monomers, dissolved or dispersed in (2) from about 40 to about 75 weight percent of a polyol having a hydroxyl number of less than about 150, the polymer/polyol having a product viscosity which is lower than if said polymer/polyol had been prepared in the absence of said polymer control agent and an intrinsic viscosity of at least 0.30.

71. The polymer/polyol composition of claim 70 wherein said polymer control agent is methanol.

72. The polymer/polyol composition of claim 70 wherein said polymer control agent is a mixture of methanol and water.

73. A process for reducing the viscosity of a polymer/polyol, capable of conversion to a polyurethane, which comprises: (a) providing a normally liquid, stable polymer/polyol composition formed by polymerizing in the presence of a free radical catalyst (1) from about 25 to about 60 weight percent of an ethylenically unsaturated monomer or monomers, dissolved or dispersed in (2) from about 40 to about 75 weight percent of a base polyol having a hydroxyl number of less than about 150, said polymer being present in the form of particles and characterized by an intrinsic viscosity of at least 0.30, and said polymer/polyol composition having a viscosity above its indigenous viscosity and (b) treating the polymer/polyol to reduce the viscosity of the polymer/polyol composition to essentially its indigenous viscosity.

74. The process of claim 63 wherein a monomer mixture is used which includes acrylonitrile or styrene.

75. The process of claim 74 wherein said treating step comprises heating the polymer/polyol composition to a temperature and for a time sufficient to reduce the viscosity of the polymer/polyol composition to essentially its indigenous viscosity.

76. The process of claim 74 wherein said treating step comprises treating the polymer/polyol composition in the presence of a solvating agent in an amount sufficient to reduce the composition viscosity to essentially its indigenous viscosity.

77. A polyurethane produced by reacting a mixture comprising (a) the polymer/polyol composition of claim 1, (b) an organic polyisocyanate and (c) a catalyst for the reaction of (a) and (b) to produce the polyurethane.

78. A polyurethane produced by reacting a mixture comprising (a) the polymer/polyol composition of claim 2, (b) an organic polyisocyanate and (c) a catalyst for the reaction of (a) and (b) to produce the polyurethane.

79. A polyurethane produced by reacting a mixture comprising (a) the polymer/polyol composition of claim 13, (b) an organic polyisocyanate and (c) a catalyst for the reaction of (a) and (b) to produce the polyurethane.

80. A polyurethane produced by reacting a mixture comprising (a) the polymer/polyol composition of claim 14, (b) an organic polyisocyanate and (c) a catalyst for the reaction of (a) and (b) to produce the polyurethane.

81. A polyurethane produced by reacting a mixture comprising (a) the polymer/polyol composition of claim 27, (b) an organic polyisocyanate and (c) a catalyst for the reaction of (a) and (b) to produce the polyurethane.

82. A polyurethane produced by reacting a mixture comprising (a) the polymer/polyol composition of claim 29, (b) an organic polyisocyanate and (c) a catalyst for the reaction of (a) and (b) to produce the polyurethane.

83. A polyurethane produced by reacting a mixture comprising (a) the polymer/polyol composition of claim 35, (b) an organic polyisocyanate and (c) a catalyst for the reaction of (a) and (b) to produce the polyurethane.

84. A polyurethane produced by reacting a mixture comprising (a) the polymer/polyol composition of claim 37, (b) an organic polyisocyanate and (c) a catalyst for the reaction of (a) and (b) to produce the polyurethane.

85. A polyurethane produced by reacting a mixture comprising (a) the polymer/polyol composition of claim 47, (b) an organic polyisocyanate and (c) a catalyst for the reaction of (a) and (b) to produce the polyurethane.

86. A polyurethane produced by reacting a mixture comprising (a) the polymer/polyol composition of claim 70, (b) an organic polyisocyanate and (c) a catalyst for the reaction of (a) and (b) to produce the polyurethane.

87. A polyurethane produced by reacting a mixture comprising (a) the polymer/polyol composition of claim 71, (b) an organic polyisocyanate and (c) a catalyst for the reaction of (a) and (b) to produce the polyurethane.

88. A polyurethane produced by reacting a mixture comprising (a) the polymer/polyol composition of claim 72, (b) an organic polyisocyanate and (c) a catalyst for the reaction of (a) and (b) to produce the polyurethane.

* * * * *